(12) United States Patent
Okamoto

(10) Patent No.: US 12,101,451 B2
(45) Date of Patent: Sep. 24, 2024

(54) FACSIMILE TRANSMISSION SYSTEM, FACSIMILE TRANSMISSION METHOD, AND NON-TRANSITORY RECORDING MEDIUM FOR DETERMINING WHICH FACSIMILE TRANSMISSION IS PERFORMED BASED ON ATTRIBUTE

(71) Applicant: Takuya Okamoto, Kanagawa (JP)

(72) Inventor: Takuya Okamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/526,053

(22) Filed: Dec. 1, 2023

(65) Prior Publication Data
US 2024/0214502 A1   Jun. 27, 2024

(30) Foreign Application Priority Data

Dec. 23, 2022   (JP) .................................. 2022-207278
Sep. 29, 2023   (JP) .................................. 2023-169952

(51) Int. Cl.
*H04N 1/00* (2006.01)
*H04N 1/32* (2006.01)
*H04N 1/327* (2006.01)

(52) U.S. Cl.
CPC ....... *H04N 1/3275* (2013.01); *H04N 1/00856* (2013.01); *H04N 1/32005* (2013.01); *H04N 1/32406* (2013.01)

(58) Field of Classification Search
None
See application file for complete search history.

(56) References Cited

U.S. PATENT DOCUMENTS

| | | | | |
|---|---|---|---|---|
| 2008/0024833 | A1* | 1/2008 | Kawasaki | H04N 1/00244 358/468 |
| 2013/0088741 | A1* | 4/2013 | Murata | H04N 1/00421 358/1.14 |
| 2015/0092250 | A1* | 4/2015 | Goto | H04N 1/00408 358/407 |
| 2016/0050336 | A1 | 2/2016 | Okamoto | |
| 2018/0213122 | A1* | 7/2018 | Kotha | H04N 1/32122 |
| 2020/0076965 | A1* | 3/2020 | Kwon | H04N 1/32432 |
| 2020/0177745 | A1 | 6/2020 | Ishida | |
| 2020/0236246 | A1* | 7/2020 | Rebert | H04N 1/0001 |
| 2021/0014371 | A1 | 1/2021 | Utoh et al. | |

(Continued)

FOREIGN PATENT DOCUMENTS

| | | |
|---|---|---|
| JP | 2014-014023 A | 1/2014 |
| JP | 2020-087359 A | 6/2020 |
| JP | 2021-016147 A | 2/2021 |

*Primary Examiner* — Henok Shiferaw
(74) *Attorney, Agent, or Firm* — IPUSA, PLLC

(57) ABSTRACT

A facsimile transmission system includes circuitry to receive, from a user, a request for facsimile transmission of a document, and determine which one of first facsimile transmission and second facsimile transmission is to be performed, based on one of an attribute of the user, an attribute of a destination of the facsimile transmission, and an attribute of the document. The first facsimile transmission is transmitting the document by an image forming apparatus, and the second facsimile transmission is transmitting the document by a facsimile server. The circuitry further instructs to perform the one of the first facsimile transmission and the second facsimile transmission.

9 Claims, 14 Drawing Sheets

(56) References Cited

U.S. PATENT DOCUMENTS

2021/0297551 A1    9/2021  Okamoto
2022/0103703 A1*  3/2022  Abiru ................. H04N 1/00408
2023/0083081 A1*  3/2023  Toscano ............. H04L 65/1106
                                                                             379/100.15

* cited by examiner

FIG. 5

| ATTRIBUTE | | VALUE (OPTION) | REMARKS |
|---|---|---|---|
| USER | PRIORITY OF ATTRIBUTES | ·USER PRIORITY<br>·DESTINATION PRIORITY<br>·DOCUMENT PRIORITY | |
| | FAX TO BE USED | ·NORMAL FAX<br>·CLOUD FAX<br>·AUTOMATIC DETERMINATION | |
| | EXTERNAL USE OF FAX | ·YES<br>·NO | |
| DESTINATION | FAX TO BE USED | ·NORMAL FAX<br>·CLOUD FAX<br>·AUTOMATIC DETERMINATION | |
| | TYPE | ·CUSTOMER<br>·VENDOR<br>·OTHER | |
| | NUMBER OF DESTINATIONS | ·LESS THAN 10<br>·10 OR MORE | |
| DOCUMENT | CONFIDENTIALITY LEVEL | ·INTERNAL USE ONLY<br>·PERSONAL INFORMATION INCLUDED<br>·OTHER | DETERMINED FROM KEYWORD EXTRACTED FROM OCR-PROCESSED DOCUMENT |
| | PAPER SIZE | ·A4<br>·B4<br>·A3<br>·LONG PAPER | |

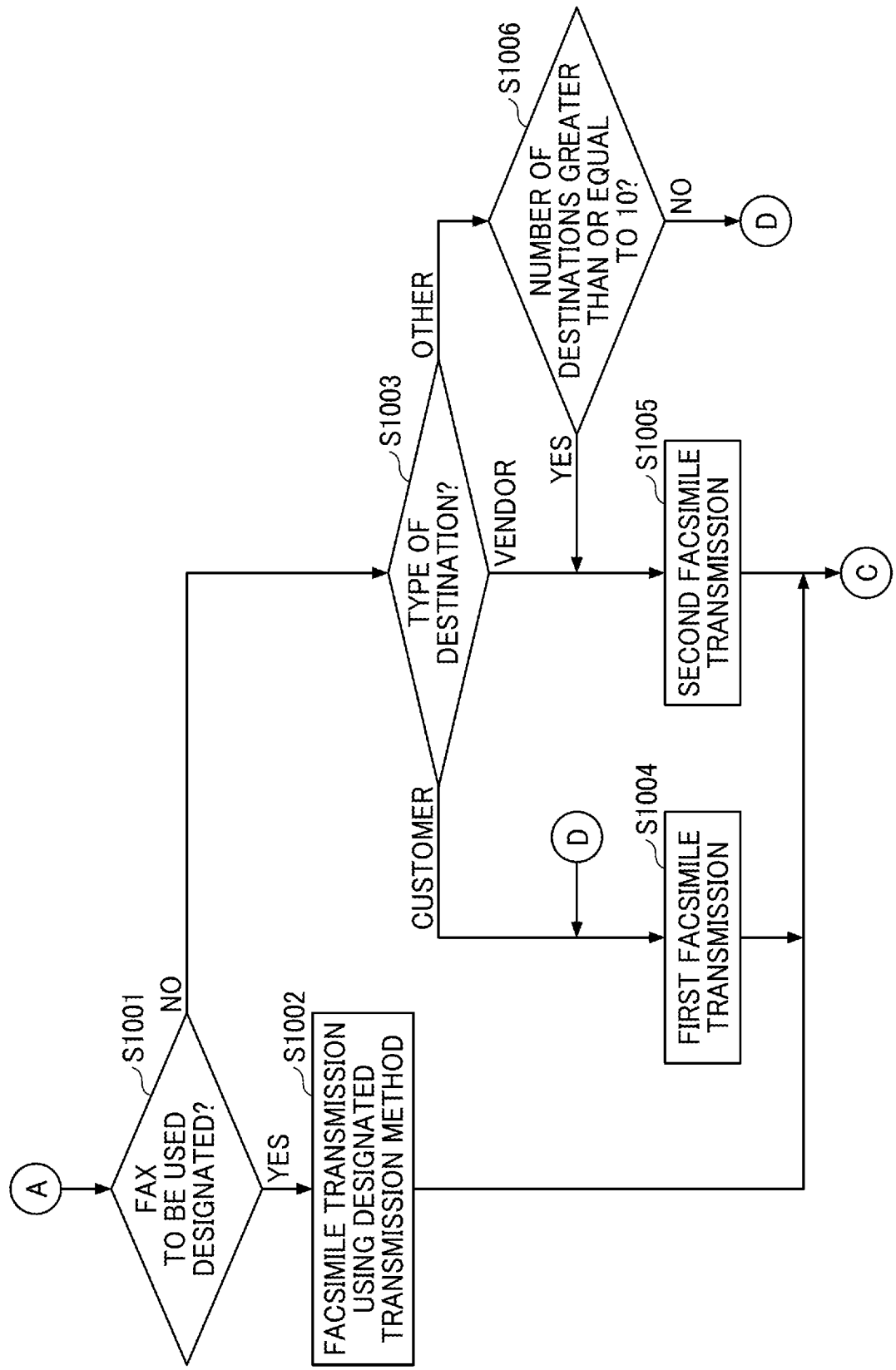

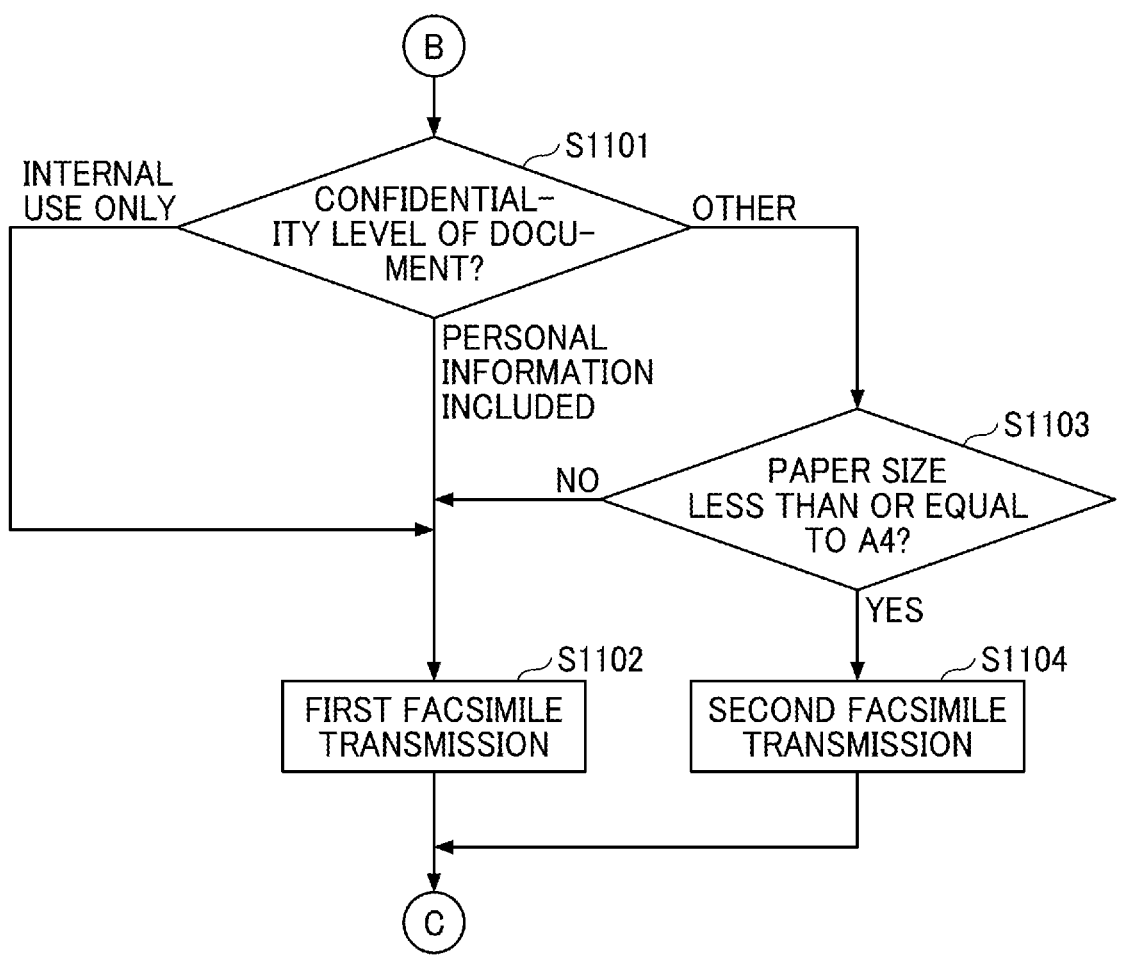

FIG. 12

| | ATTRIBUTE | | VALUE (OPTION) | REMARKS |
|---|---|---|---|---|
| | | PRIORITY OF ATTRIBUTES | ·USER PRIORITY<br>·DESTINATION PRIORITY<br>·DOCUMENT PRIORITY | |
| USER | | FAX TO BE USED | ·NORMAL FAX<br>·CLOUD FAX<br>·AUTOMATIC DETERMINATION | |
| | | PRIORITY OF ITEMS | ·TRANSMISSION HISTORY OF USER > EXTERNAL ACCESS TO FAX<br>·EXTERNAL ACCESS TO FAX | |
| | | EXTERNAL USE OF FAX | ·YES<br>·NO | |
| | | TRANSMISSION HISTORY OF USER | ·FIRST FACSIMILE TRANSMISSION<br>·SECOND FACSIMILE TRANSMISSION<br>·OTHER (BOTH OR NONE) | |
| DES-TINA-TION | | FAX TO BE USED | ·NORMAL FAX<br>·CLOUD FAX<br>·AUTOMATIC DETERMINATION | |
| | | PRIORITY OF ITEMS | ·TRANSMISSION HISTORY OF DESTINATION > TYPE > NUMBER OF DESTINATIONS<br>·TRANSMISSION HISTORY OF DESTINATION > NUMBER OF DESTINATIONS > TYPE<br>·TYPE > TRANSMISSION HISTORY OF DESTINATION > NUMBER OF DESTINATIONS<br>... | |
| | | TYPE | ·CUSTOMER<br>·VENDOR<br>·OTHER | |
| | | NUMBER OF DESTINATIONS | ·LESS THAN 10<br>·10 OR MORE | |
| | | TRANSMISSION HISTORY OF DESTINATION | ·FIRST FACSIMILE TRANSMISSION<br>·SECOND FACSIMILE TRANSMISSION<br>·OTHER (BOTH OR NONE) | |
| DOC-U-MENT | | CONFIDENTI-ALITY LEVEL | ·INTERNAL USE ONLY<br>·PERSONAL INFORMATION INCLUDED<br>·OTHER | DETERMINED FROM KEYWORD EXTRACTED FROM OCR-PROCESSED DOCUMENT |
| | | PAPER SIZE | ·A4<br>·B4<br>·A3<br>·LONG PAPER | |

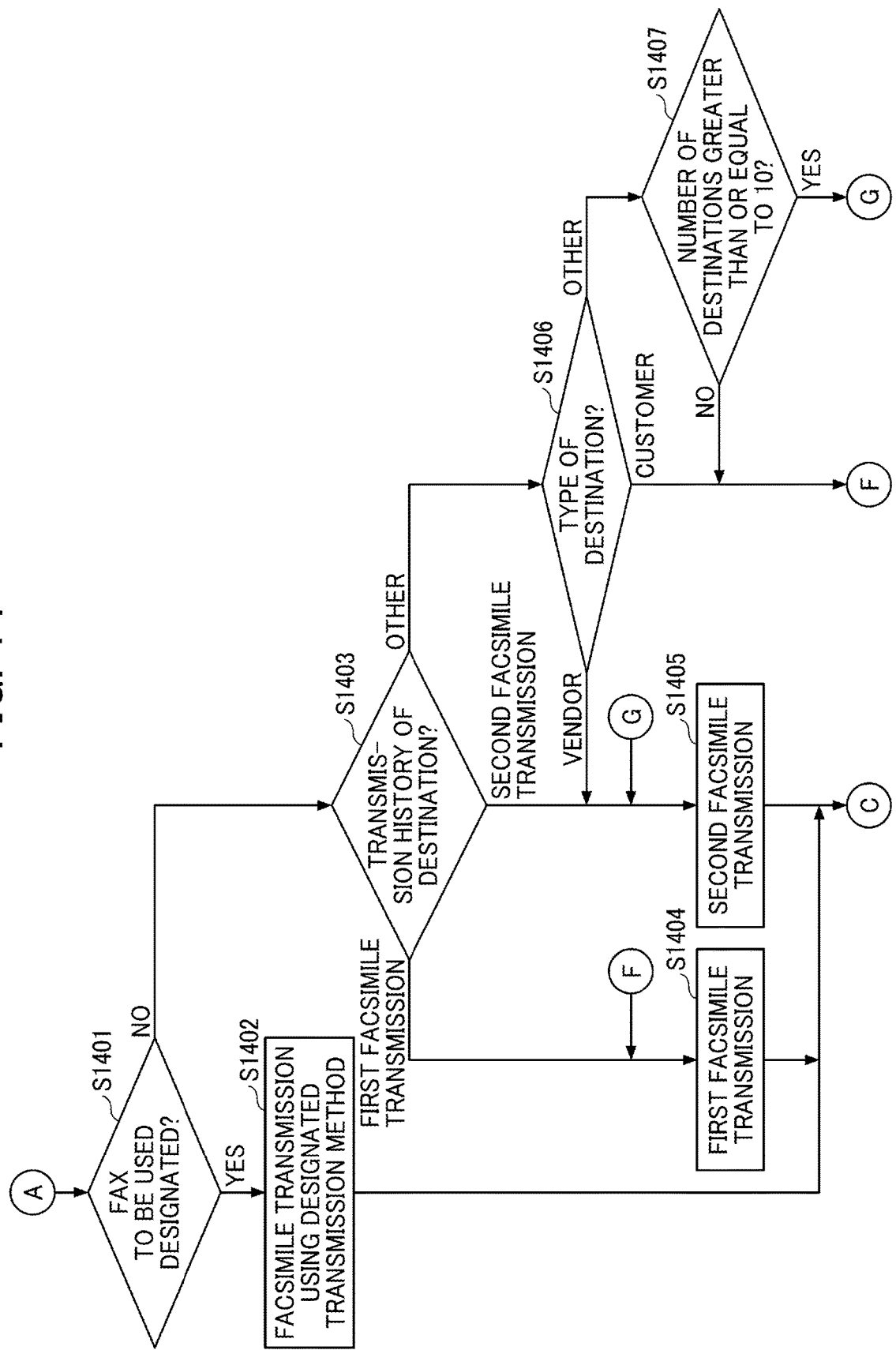

FACSIMILE TRANSMISSION SYSTEM, FACSIMILE TRANSMISSION METHOD, AND NON-TRANSITORY RECORDING MEDIUM FOR DETERMINING WHICH FACSIMILE TRANSMISSION IS PERFORMED BASED ON ATTRIBUTE

CROSS-REFERENCE TO RELATED APPLICATIONS

This patent application is based on and claims priority pursuant to 35 U.S.C. § 119(a) to Japanese Patent Application Nos. 2022-207278, filed on Dec. 23, 2022, and 2023-169952, filed on Sep. 29, 2023, in the Japan Patent Office, the entire disclosure of which is hereby incorporated by reference herein.

BACKGROUND

Technical Field

The present disclosure relates to a facsimile transmission system, a facsimile transmission method, and a non-transitory recording medium.

Related Art

A technique for facsimile transmission using an image forming apparatus or facsimile transmission using a facsimile server through a communication network such as the Internet is known.

Another known technique for facsimile transmission through a communication network is to select a facsimile transmission means from among a plurality of available facsimile transmission means, based on a communication fee estimated from the distance between a facsimile transmitter and a destination.

SUMMARY

According to an embodiment of the present disclosure, a facsimile transmission system includes circuitry to receive, from a user, a request for facsimile transmission of a document, and determine which one of first facsimile transmission and second facsimile transmission is to be performed, based on one of an attribute of the user, an attribute of a destination of the facsimile transmission, and an attribute of the document. The first facsimile transmission is transmitting the document by an image forming apparatus, and the second facsimile transmission is transmitting the document by a facsimile server. The circuitry further instructs to perform the one of the first facsimile transmission and the second facsimile transmission.

According to an embodiment of the present disclosure, a facsimile transmission method includes receiving, from a user, a request for facsimile transmission of a document, and determining which one of first facsimile transmission and second facsimile transmission is to be performed, based on one of an attribute of the user, an attribute of a destination of the facsimile transmission, and an attribute of the document. The first facsimile transmission is transmitting the document by an image forming apparatus, and the second facsimile transmission is transmitting the document by a facsimile server. The method further includes instructing to perform the one of the first facsimile transmission and the second facsimile transmission.

According to an embodiment of the present disclosure, a non-transitory recording medium stores a plurality of instructions which, when executed by one or more processors, causes the plurality of processors to perform a facsimile transmission method. The method includes receiving, from a user, a request for facsimile transmission of a document, and determining which one of first facsimile transmission and second facsimile transmission is to be performed, based on one of an attribute of the user, an attribute of a destination of the facsimile transmission, and an attribute of the document. The first facsimile transmission is transmitting the document by an image forming apparatus, and the second facsimile transmission is transmitting the document by a facsimile server. The method further includes instructing to perform the one of the first facsimile transmission and the second facsimile transmission.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a table illustrating attribute information according to an embodiment of the present disclosure;

FIG. 10 is a flowchart of the determination process according to the first embodiment of the present disclosure;

FIG. 11 is a flowchart of the determination process according to the first embodiment of the present disclosure;

FIG. 12 is a table illustrating attribute information according to a second embodiment of the present disclosure;

FIG. 14 is a flowchart of the determination process according to the second embodiment of the present disclosure.

Figure 1:
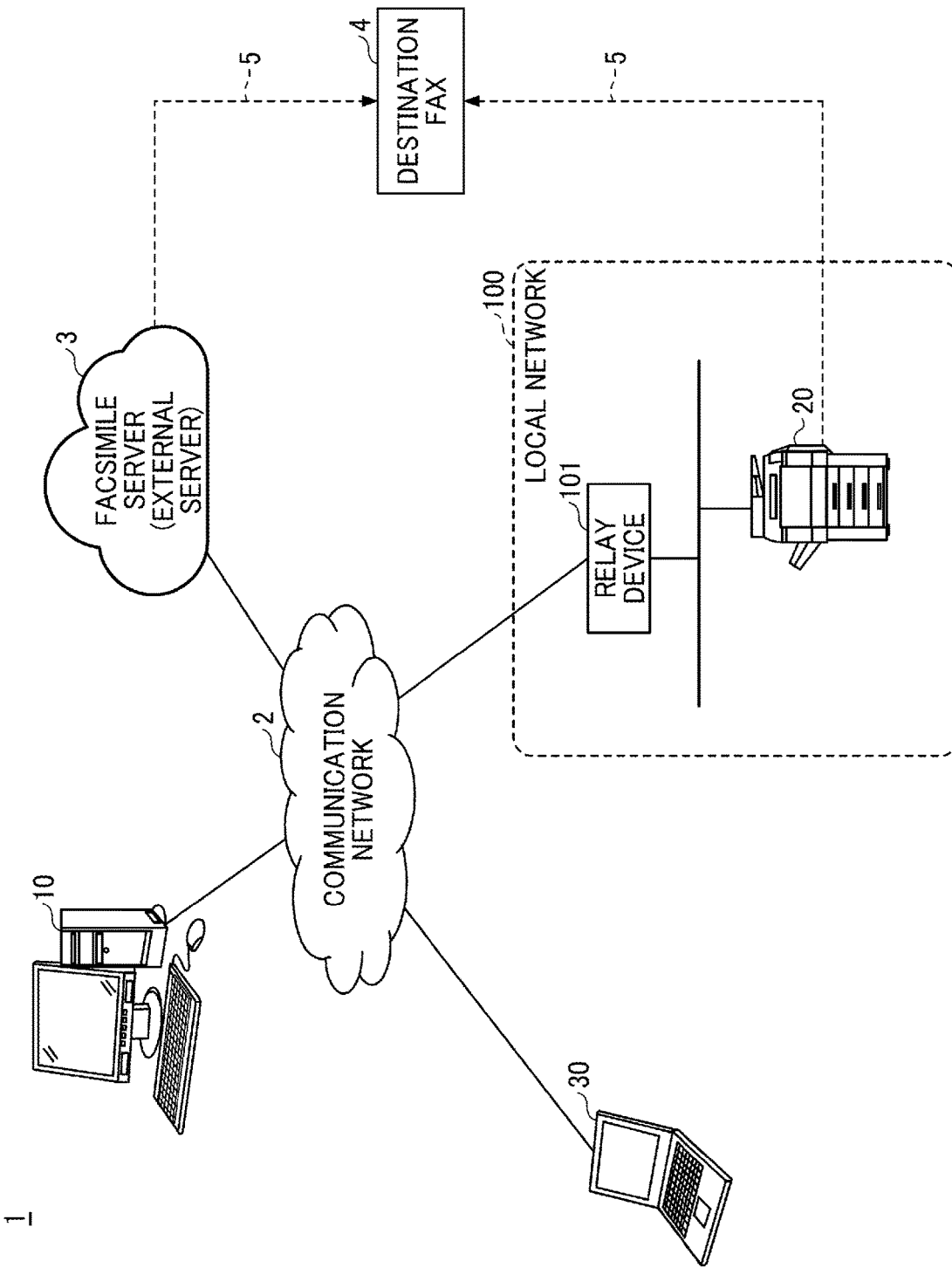
FIG. 1 is a diagram illustrating a system configuration of a facsimile transmission system according to an embodiment of the present disclosure.

The accompanying drawings are intended to depict embodiments of the present disclosure and should not be interpreted to limit the scope thereof. The accompanying drawings are not to be considered as drawn to scale unless

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure will be described in detail hereinafter with reference to the drawings.

System Configuration

FIG. 1 is a diagram illustrating a system configuration of a facsimile transmission system according to an embodiment of the present disclosure. A facsimile transmission system 1 includes, for example, a server apparatus 10, an information terminal 30, and an image forming apparatus (fax) 20. The server apparatus 10 and the information terminal 30 are connected to a communication network 2, such as the Internet, and the image forming apparatus 20 is connected to a local network 100. In the example illustrated in FIG. 1, the local network 100 is connected to the communication network 2 via a relay device 101. Examples of the relay device 101 include a router and a firewall. The image forming apparatus 20 may be connected to the communication network 2.

With the facsimile transmission system 1, first facsimile transmission and second facsimile transmission are available. In the first facsimile transmission, a document is transmitted by using the image forming apparatus 20. In the second facsimile transmission, a document is transmitted by using a facsimile server (external system) 3. As used herein, the term "facsimile transmission" refers to transmission of (transmitting) a document to a facsimile machine (hereinafter referred to as "fax") at the destination by facsimile that is a communication method for converting still images such as text, shapes, and photographs into electrical signals and transmitting and receiving the electrical signals.

The server apparatus 10 is, for example, an information processing apparatus having the configuration of a computer, or a system including a plurality of computers. The server apparatus 10 is a server that provides a cloud service for using the first facsimile transmission and the second facsimile transmission by, for example, using the information terminal 30 outside the local network 100.

The image forming apparatus 20 is, for example, an information processing apparatus having a facsimile transmission function. Examples of the image forming apparatus 20 include a multifunction peripheral (MFP) in which a scanning function, a copying function, a printing function, a facsimile (fax) function, and other suitable functions are incorporated in a single housing. The image forming apparatus 20 may be a single-function fax machine. The image forming apparatus 20 provides a web application programming interface (API) to an external apparatus such as the server apparatus 10. The web API allows access to image forming functions such as a facsimile transmission function of the image forming apparatus 20 from the outside. In one example, the server apparatus 10 and the image forming apparatus 20 are set in advance such that the server apparatus 10 and the image forming apparatus 20 can transmit and receive data to and from each other via the relay device 101.

The information terminal 30 is an information processing apparatus to be used by a user. Examples of the information terminal 30 include a personal computer (PC), a tablet terminal, and a smartphone. For example, the user can use a web browser included in the information terminal 30 or an application program (hereinafter referred to as "application") for a facsimile transmission system to use the cloud service provided by the server apparatus 10.

In one example, the user can use the information terminal 30 to request the server apparatus 10 to perform the first facsimile transmission for transmitting a document by using the image forming apparatus 20. The user can also use the information terminal 30 to request the server apparatus 10 to perform the second facsimile transmission for transmitting a document by using the facsimile server 3.

The facsimile server 3 is an external system that provides a cloud fax service. The cloud fax service is, for example, a service for transmitting and receiving faxes by using an information processing apparatus such as the server apparatus 10, the image forming apparatus 20, or the information terminal 30.

For example, the user can use the image forming apparatus 20 in the local network 100 to perform the first facsimile transmission using the image forming apparatus 20 and the second facsimile transmission using the facsimile server 3. With the use of the server apparatus 10 outside the local network 100, the user can also use the image forming apparatus 20 to perform the first facsimile transmission using the image forming apparatus 20 and the second facsimile transmission using the facsimile server 3.

In one example, even in the second facsimile transmission for transmitting a document by using the facsimile server 3, the server apparatus 10 performs the second facsimile transmission via the image forming apparatus 20. As a result, the history of the first facsimile transmission and the history of the second facsimile transmission are stored in a transmission history for the image forming apparatus 20, and the user can refer to the transmission history for the image forming apparatus 20 to check all of the histories of transmissions, accordingly. In another example, the user can use an address book registered in the image forming apparatus 20 to perform the second facsimile transmission.

In the facsimile transmission system 1 with which the first facsimile transmission using the image forming apparatus 20 and the second facsimile transmission using the facsimile server 3 are available, it is desirable to perform facsimile transmission of a document by using a transmission method more suitable than the other depending on, for example, the user, the destination, or the document.

For example, in a case where a document is to be transmitted to a plurality of destinations at once, the first facsimile transmission using the image forming apparatus 20 performs facsimile transmission to the plurality of destinations one by one in order. This may cause a situation in which a telephone line 5 is occupied for a long time. In such a case in which a document is to be transmitted to the plurality of destinations at once, it is desirable for the user to simultaneously transmit the document to the plurality of destinations by using the second facsimile transmission using the facsimile server 3. This is because the facsimile server 3 can simultaneously transmit the document to the plurality of destinations, namely can perform simultaneous facsimile transmission to the plurality of destinations, by designating the plurality of destinations.

In the second facsimile transmission using the facsimile server 3, data is transmitted through the Internet. Thus, for example, in the transmission of a confidential document to a customer, in view of reliability, security, and other concerns, it is desirable for the user to transmit the confidential document to the customer by using the first facsimile transmission using the image forming apparatus 20.

For example, in a case where a customer uses a service such as sorting incoming faxes in accordance with the telephone numbers of the senders, it is desirable for the user to transmit a document to the customer by using the first facsimile transmission. This is because the transmission of a document to the customer using the second facsimile transmission involves a change of the sender's telephone number, and the incoming fax sorted by the customer does not function well, and this can cause inconvenience to the customer.

However, some users may fail to understand the characteristics of the first facsimile transmission and the second facsimile transmission. For such users, it is difficult to perform facsimile transmission by using a transmission method (either the first facsimile transmission or the second facsimile transmission) that is more suitable than the other.

In the description of the present embodiment, a method for performing facsimile transmission by using a more suitable transmission method in the facsimile transmission system 1 with which the first facsimile transmission using the image forming apparatus 20 and the second facsimile transmission using the facsimile server 3 are available is given.

Hardware Configuration

Figure 2:
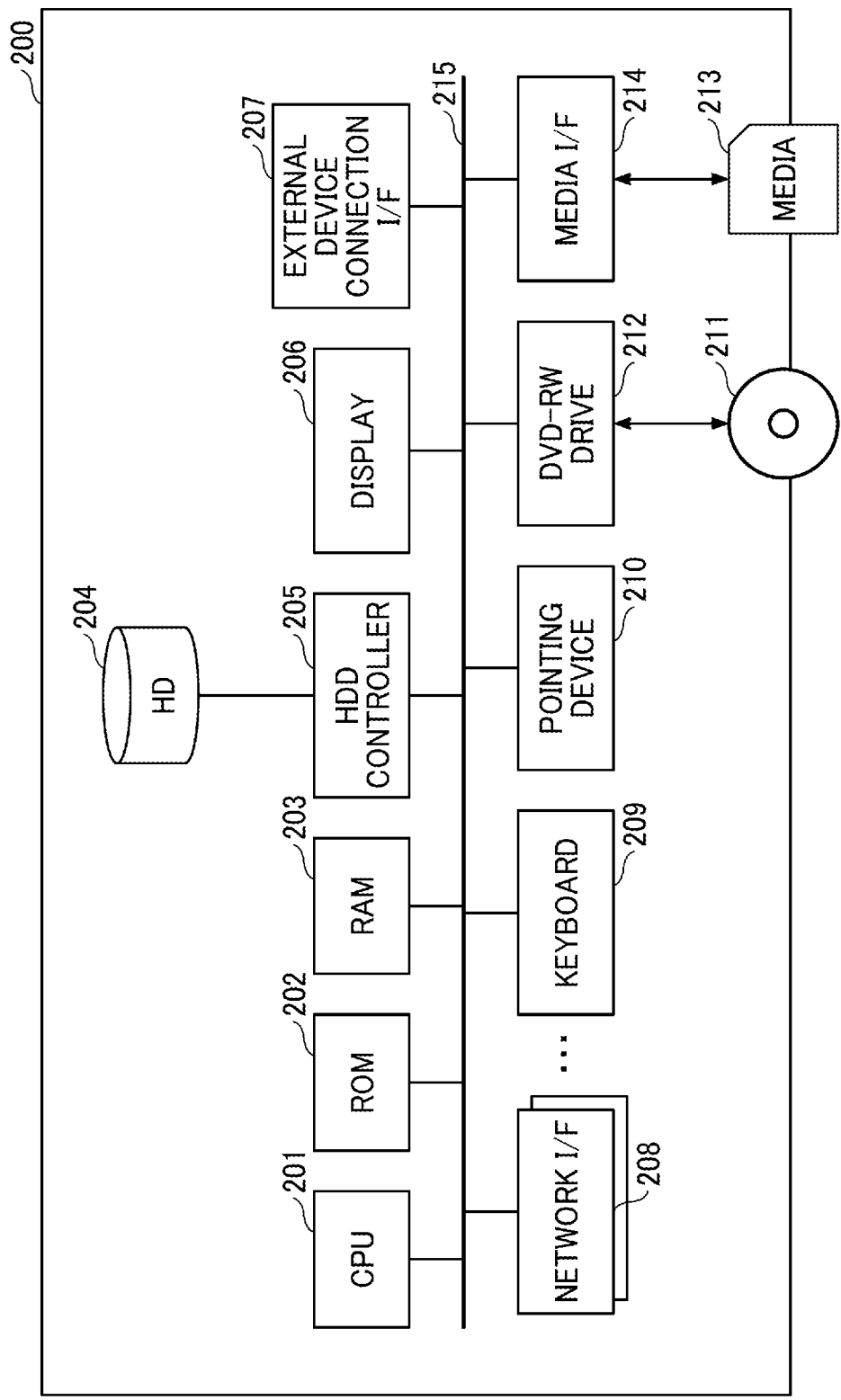
FIG. 2 is a block diagram illustrating a hardware configuration of a computer according to an embodiment of the present disclosure.

The information terminal 30, the server apparatus 10, and the facsimile server 3 have, for example, the hardware configuration of a computer 200 illustrated in FIG. 2. The server apparatus 10 and the facsimile server 3 may be implemented by a plurality of computers 200.

FIG. 2 is a block diagram illustrating a hardware configuration of a computer according to the present embodiment. As illustrated in FIG. 2, the computer 200 includes, for example, a central processing unit (CPU) 201, a read only memory (ROM) 202, a random access memory (RAM) 203, a hard disk (HD) 204, a hard disk drive (HDD) controller 205, a display 206, an external device connection interface (I/F) 207, one or more network I/Fs 208, a keyboard 209, a pointing device 210, a digital versatile disc rewritable (DVD-RW) drive 212, a media I/F 214, and a bus line 215.

The CPU 201 controls the overall operation of the computer 200. The ROM 202 stores, for example, a program used to activate the computer 200, such as an initial program loader (IPL). The RAM 203 is used as, for example, a work area for the CPU 201. The HD 204 stores, for example, programs such as an operating system (OS), an application, and a device driver, and various data. The HDD controller 205 controls reading or writing of various data from or to the HD 204 under the control of the CPU 201.

The display 206 displays various types of information such as a cursor, a menu, a window, text, or an image. The display 206 may be disposed outside the computer 200. The external device connection I/F 207 is an interface for connecting various external devices to the computer 200. The one or more network I/Fs 208 are an interface or interfaces for performing data communication using, for example, the communication network 2 or the local network 100.

The keyboard 209 is an example of an input device including a plurality of keys for inputting text, numerical values, various instructions, and the like. The pointing device 210 is a type of input device for selecting or executing various instructions, selecting a target for processing, or moving the cursor being displayed, for example. The keyboard 209 and the pointing device 210 may be disposed outside the computer 200.

The DVD-RW drive 212 reads and writes various data from and to a DVD-RW 211, which is an example of a removable recording medium. The DVD-RW 211 may be any other removable recording medium, instead of a DVD-RW. The media I/F 214 controls reading or writing (storing) of data from or to a medium 213 such as a flash memory. The bus line 215 includes an address bus, a data bus, various control signal buses, and the like for electrically connecting the components described above.

The configuration of the computer 200 illustrated in FIG. 2 is an example. The computer 200 may have any other configuration including, for example, the CPU 201, the ROM 202, the RAM 203, the one or more network I/Fs 208, and the bus line 215.

Hardware Configuration of Image Forming Apparatus

In the following description, in one example, the image forming apparatus 20 is an MFP in which a scanning function, a copying function, a printing function, a facsimile (fax) function, and other suitable functions are incorporated in a single housing.

Figure 3:
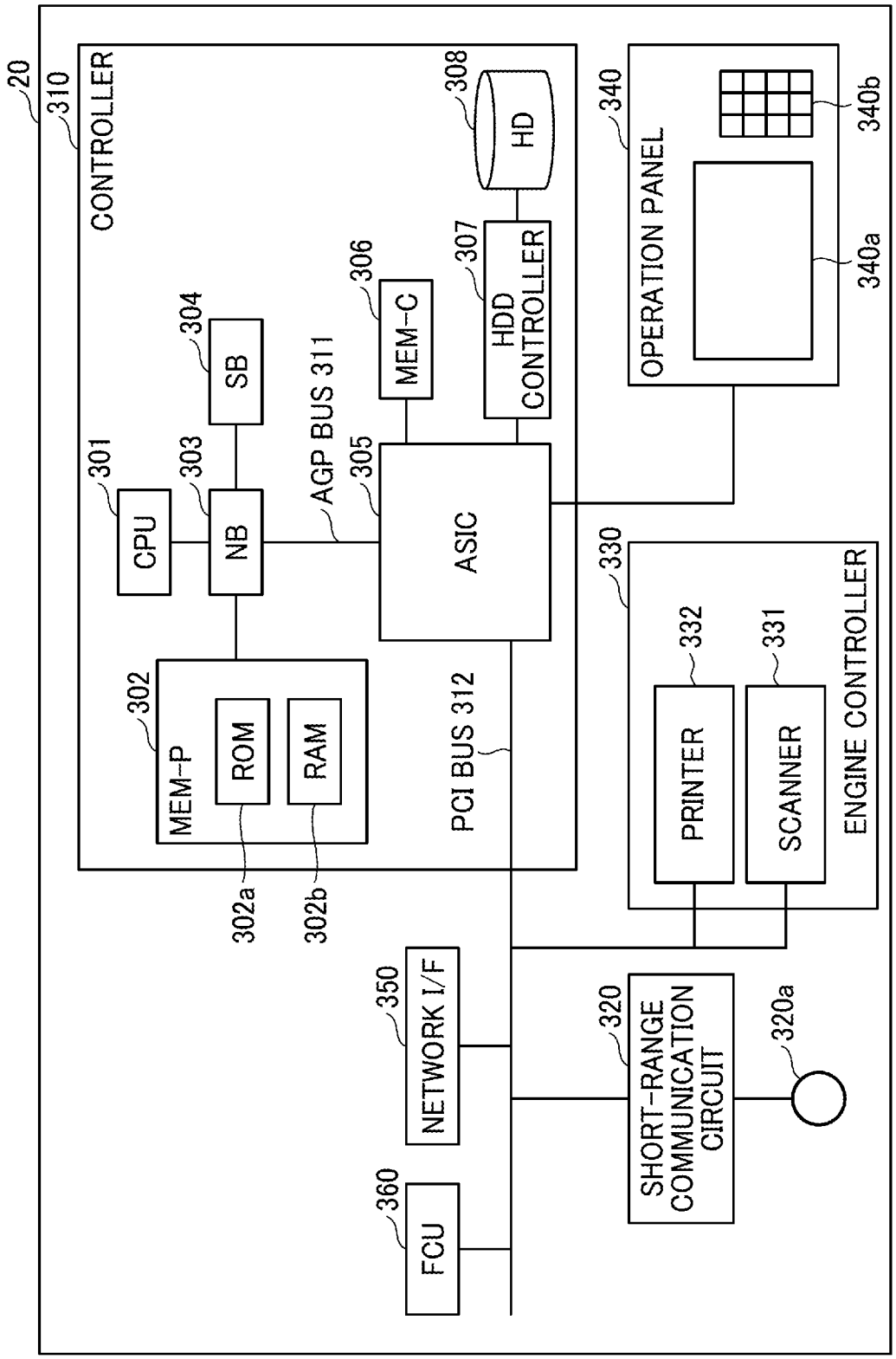
FIG. 3 is a block diagram illustrating a hardware configuration of an image forming apparatus according to an embodiment of the present disclosure.

FIG. 3 is a diagram illustrating a hardware configuration of an image forming apparatus according to the present embodiment. As illustrated in FIG. 3, the image forming apparatus 20 includes, for example, a controller 310, a short-range communication circuit 320, an engine controller 330, an operation panel 340, a network I/F 350, and a facsimile control unit (FCU) 360.

The controller 310 includes a CPU 301 as a main processor, a system memory (MEM-P) 302, a north bridge (NB) 303, a south bridge (SB) 304, an application specific integrated circuit (ASIC) 305, a local memory (MEM-C) 306 as a storage unit, an HDD controller 307, and an HD 308 as a storage unit. The NB 303 and the ASIC 305 are connected to each other through an accelerated graphics port (AGP) bus 311.

The CPU 301 is a control unit that controls the overall operation of the image forming apparatus 20. The NB 303 connects the CPU 301 to the MEM-P 302, the SB 304, and the AGP bus 311. The NB 303 includes a memory controller for controlling reading or writing of data from or to the MEM-P 302, a peripheral component interconnect (PCI) master, and an AGP target.

The MEM-P 302 includes a ROM 302a as a memory that stores a program or data for implementing various functions of the controller 310. The MEM-P 302 further includes a RAM 302b as a memory that loads the program or data or as a drawing memory that stores drawing data for printing. The program stored in the RAM 302b may be stored in a computer-readable recording medium, such as a compact disc read only memory (CD-ROM), a compact disc recordable (CD-R), or a digital versatile disc (DVD), in an installable or executable file format for distribution.

The SB 304 connects the NB 303 to a PCI device or a peripheral device. The ASIC 305 is an integrated circuit (IC)

for use in image processing applications and including hardware elements for image processing. The ASIC 305 connects the AGP bus 311, a PCI bus 312, the HDD controller 307, and the MEM-C 306 to each other. The ASIC 305 includes a PCI target, an AGP master, an arbiter (ARB) as a central processor of the ASIC 305, a memory controller, a plurality of direct memory access controllers (DMACs), and a PCI unit. The memory controller controls the MEM-C 306. The DMACs are configured to, for example, rotate image data with a hardware logic. The PCI unit transfers data to a scanner 331 and a printer 332 through the PCI bus 312. The ASIC 305 may be connected to a Universal Serial Bus (USB) interface or an Institute of Electrical and Electronics Engineers (IEEE) 1394 interface.

The MEM-C 306 is a local memory used as a buffer for image data to be copied or a code buffer. The HD 308 stores image data, font data for printing, and form data. The HD 308 may store programs including an OS, applications, and device drivers, and various data. The HDD controller 307 controls reading or writing of data from or to the HD 308 under the control of the CPU 301. The AGP bus 311 is a bus interface for a graphics accelerator card, which has been proposed to accelerate graphics processing. The AGP bus 311 provides high-throughput direct access to the MEM-P 302 to make the graphics accelerator card fast.

The short-range communication circuit 320 is provided with a short-range communication circuit antenna 320a to perform various types of short-range wireless communication. The engine controller 330 includes the scanner 331 and the printer 332, for example. The scanner 331 is a reading device that reads, for example, a document. The printer 332 is a printing device that prints print data on a print medium. The scanner 331 or the printer 332 includes, for example, an image processor configured to perform image processing such as error diffusion or gamma conversion.

The operation panel 340 includes a panel display 340a and operation keys 340b. The panel display 340a is configured to display, for example, current set values and a selection screen to receive an input from the operator. Examples of the panel display 340a include a touch panel. The operation keys 340b include, for example, a numeric keypad for receiving conditions for image formation, such as a density setting condition, and a start key for receiving an instruction to start copying. The controller 310 controls the overall operation of the image forming apparatus 20. For example, the controller 310 controls drawing, communication, or user inputs through the operation panel 340.

In one example, the operation panel 340 has an application switch key. In response to the use of the application switch key, the image forming apparatus 20 sequentially and selectively implements a document box function, a copy function, a printer function, and a facsimile function. The image forming apparatus 20 enters a document box mode when the document box function is selected, enters a copy mode when the copy function is selected, enters a printer mode when the printer function is selected, and enters a facsimile mode when the facsimile function is selected.

The network I/F 350 is an interface for performing data communications using a communication network. The FCU 360 performs facsimile transmission and reception. The short-range communication circuit 320, the network I/F 350, and the FCU 360 are electrically connected to the ASIC 305 through the PCI bus 312, for example.

Functional Configuration

Figure 4:
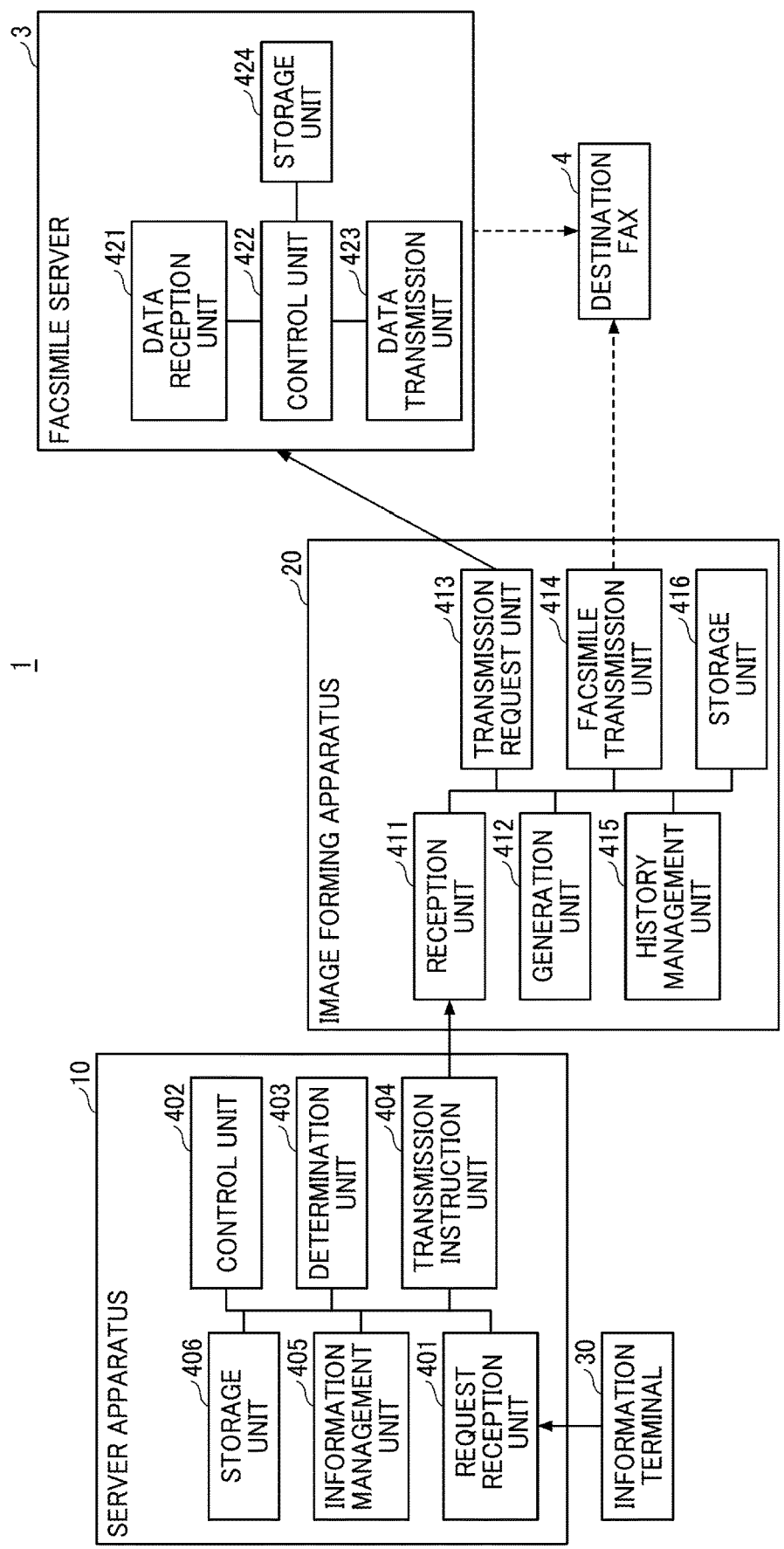
FIG. 4 is a block diagram illustrating a functional configuration of the facsimile transmission system of FIG. 1 according to an embodiment of the present disclosure.

Next, the functional configuration of the facsimile transmission system 1 will be described. FIG. 4 is a block diagram illustrating a functional configuration of a facsimile transmission system according to the present embodiment.

Functional Configuration of Server Apparatus

In the server apparatus 10, one or more computers 200 execute a program stored in a storage medium to implement, for example, a request reception unit 401, a control unit 402, a determination unit 403, a transmission instruction unit 404, and an information management unit 405. At least some of the functional components described above may be implemented by hardware.

The server apparatus 10 further includes a storage unit 406 that is implemented by the HD 204, the HDD controller 205, or the RAM 203.

The request reception unit 401 executes a request receiving process for receiving, from the user, a facsimile transmission request for requesting to execute facsimile transmission of a document. In one example, the request reception unit 401 provides a web page, or a web API to the information terminal 30 to receive the facsimile transmission request.

The control unit 402 controls, for example, the request reception unit 401, the determination unit 403, the transmission instruction unit 404, and the information management unit 405. The control unit 402 may include the request reception unit 401, the determination unit 403, the transmission instruction unit 404, or the information management unit 405.

The determination unit 403 executes a determination process for determining whether to perform the first facsimile transmission or the second facsimile transmission, namely which one of the first facsimile transmission and the second facsimile transmission is to be performed, in response to the facsimile transmission request received by the request reception unit 401, based on, for example, the attribute of the user, the attribute of the destination of the facsimile transmission, or the attribute of the document. For example, the determination unit 403 determines whether to perform the first facsimile transmission or the second facsimile transmission, namely which one of the first facsimile transmission and the second facsimile transmission is to be performed, based on attribute information 500 illustrated in FIG. 5.

FIG. 5 is a table illustrating attribute information according to the present embodiment. FIG. 5 illustrates an image of the attribute information 500 managed by the information management unit 405. In one example, the attribute information 500 stores information such as a "user" attribute 501, a "destination" attribute 502, and a "document" attribute 503.

In one example, the "user" attribute 501 includes information such as items "priority of attributes" 511, "fax to be used," and "external use of fax."

The item "priority of attributes" 511 in the "user" attribute 501 is a setting value set by, for example, the administrator or the user, and one of the "user" attribute 501, the "destination" attribute 502, and the "document" attribute 503 is set as an attribute to be prioritized. For example, when the item "priority of attributes" 511 is set to "user priority," the determination unit 403 determines whether to perform the first facsimile transmission or the second facsimile transmission, namely which one of the first facsimile transmission and the second facsimile transmission is to be performed, based on the "user" attribute 501. When the item "priority of attributes" 511 is set to "destination priority," the determination unit 403 determines whether to perform the first facsimile transmission or the second facsimile transmission, namely which one of the first facsimile transmission and the second facsimile transmission is to be performed, based on the "destination" attribute 502. When the item "priority of attributes" 511 is set to "document priority," the determination unit 403 determines whether to perform the first facsimile transmission or the second facsimile transmission, namely which one of the first facsimile transmission and the second facsimile transmission is to be performed, based on the "document" attribute 503. The item "priority of attributes" 511 in the "user" attribute 501 is an example of setting information indicating an attribute to be prioritized among the attribute of the user, the attribute of the destination, and the attribute of the document.

The item "fax to be used" in the "user" attribute 501 is a setting value set by, for example, the administrator or the user, and the facsimile transmission method to be used is set when the item "priority of attributes" 511 is set to "user priority." For example, when the item "fax to be used" is set to "normal fax," the determination unit 403 determines to perform the first facsimile transmission for performing facsimile transmission of a document by using the image forming apparatus 20. When the item "fax to be used" is set to "cloud fax," the determination unit 403 determines to perform the second facsimile transmission for performing facsimile transmission of a document by using the facsimile server 3. When the item "fax to be used" is set to "automatic determination," the determination unit 403 determines whether to perform the first facsimile transmission or the second facsimile transmission, namely which one of the first facsimile transmission and the second facsimile transmission is to be performed, based on another item (in the illustrated example, "external use of fax") in the "user" attribute 501.

The item "external use of fax" in the "user" attribute 501 is a setting value set by, for example, the administrator or the user, and, for example, information indicating whether access to the fax from outside the local network 100 is allowed is set. For example, when the item "external use of fax" is set to "YES," which indicates there is external use of fax, the determination unit 403 determines to perform the second facsimile transmission for performing facsimile transmission of a document by using the facsimile server 3, by way of example but not limitation. On the other hand, when the item "external use of fax" is set to "NO," which indicates there is no external use of fax, the determination unit 403 determines to perform the first facsimile transmission for performing facsimile transmission of a document by using the image forming apparatus 20, by way of example but not limitation.

The item "fax to be used" in the "destination" attribute 502 is a setting value set by, for example, the administrator or the user, and the facsimile transmission method to be used is set when the item "priority of attributes" 511 is set to "destination priority." For example, when the item "fax to be used" is set to "normal fax," the determination unit 403 determines to perform the first facsimile transmission for performing facsimile transmission of a document by using the image forming apparatus 20. When the item "fax to be used" is set to "cloud fax," the determination unit 403 determines to perform the second facsimile transmission for performing facsimile transmission of a document by using the facsimile server 3. When the item "fax to be used" is set to "automatic determination," the determination unit 403 determines whether to perform the first facsimile transmission or the second facsimile transmission, namely which one of the first facsimile transmission and the second facsimile transmission is to be performed, based on another item (in the illustrated example, "type" and "number of destinations") in the "destination" attribute 502.

The item "type" in the "destination" attribute 502 is information indicating the attribute of the destination of the facsimile transmission, and includes, by way of example but not limitation, information such as "customer," "vendor," and "other." For example, when the item "type" is set to "customer," the determination unit 403 determines to perform the first facsimile transmission for performing facsimile transmission of a document by using the image forming apparatus 20, by way of example but not limitation. This is because in the second facsimile transmission using the facsimile server 3, facsimile transmission is performed from a telephone number different from the telephone number of the image forming apparatus 20, which may cause inconvenience to the customer on which the incoming fax sorting according to the telephone number of the sender is enabled.

When the item "type" is set to "vendor," the determination unit 403 determines to perform the second facsimile transmission for performing facsimile transmission of a document by using the facsimile server 3, by way of example but not limitation. When the item "type" is set to "other," the determination unit 403 determines whether to perform the first facsimile transmission or the second facsimile transmission, namely which one of the first facsimile transmission and the second facsimile transmission is to be performed, based on the next item (in the illustrated example, "number of destinations") in the "destination" attribute 502. For example, when the "number of destinations" is "less than 10," the determination unit 403 determines to perform the first facsimile transmission for performing facsimile transmission of a document by using the image forming apparatus 20, by way of example but not limitation. When the "number of destinations" is "10 or more," the determination unit 403 determines to perform the second facsimile transmission for performing facsimile transmission of a document by using the facsimile server 3, by way of example but not limitation. This is because, as described above, facsimile transmission to many destinations using the image forming apparatus 20 occupies the telephone line 5 for a long period of time, which may adversely affect, for example, facsimile transmission and reception.

The item "confidentiality level" in the "document" attribute 503 is information indicating the confidentiality level of the document. For example, the determination unit 403 determines whether the confidentiality level of the document is "internal use only" or "personal information included," based on a keyword. The keyword is extracted by the control unit 402 executing an optical character recognition/reader (OCR) process on the document. For example, when the item "confidentiality level" is set to "internal use only" or "personal information included," the determination unit 403 determines to perform the first facsimile transmission for performing facsimile transmission of a document by using the image forming apparatus 20, by way of example but not limitation.

When the item "confidentiality level" is set to "other" (not "internal use only" or "personal information included"), the determination unit 403 determines whether to perform the first facsimile transmission or the second facsimile transmission, namely which one of the first facsimile transmission and the second facsimile transmission is to be performed, based on the next item (in the illustrated example, "paper size") in the "document" attribute 503. For example, when the item "paper size" is less than or equal to "A4," the determination unit 403 determines to perform the second facsimile transmission for performing facsimile transmission of a document by using the facsimile server 3, by way of example but not limitation. On the other hand, when the "paper size" is greater than "A4," the determination unit 403 determines to perform the first facsimile transmission for performing facsimile transmission of a document by using the image forming apparatus 20, by way of example but not limitation. This is because in the facsimile transmission using the facsimile server 3, a document having a size exceeding A4 may be scaled down, and the scaled-down version may be transmitted via fax.

As described above, the determination unit 403 determines whether to perform the first facsimile transmission or the second facsimile transmission, namely which one of the first facsimile transmission and the second facsimile transmission is to be performed, based on the attribute information 500. The information included in the attribute information 500 illustrated in FIG. 5 and the determination method of the determination unit 403 described above are an example, and various modifications and applications are possible.

Referring back to FIG. 4, the functional configuration of the server apparatus 10 will be described. The transmission instruction unit 404 executes a facsimile transmission process for instructing to perform the first facsimile transmission or the second facsimile transmission based on the determination result obtained by the determination unit 403. For example, when the determination unit 403 determines to perform the first facsimile transmission, the transmission instruction unit 404 uses a web API provided by the image forming apparatus 20 to instruct the image forming apparatus 20 to perform the first facsimile transmission. On the other hand, when the determination unit 403 determines to perform the second facsimile transmission, the transmission instruction unit 404 uses, for example, a web API provided by the image forming apparatus 20 to instruct the image forming apparatus 20 to perform the second facsimile transmission.

The information management unit 405 stores, for example, the attribute information 500 illustrated in FIG. 5 in the storage unit 406 and manages the attribute information 500. For example, the information management unit 405 provides a web page, or a web API for setting the attribute information 500, and stores information set by, for example, the administrator in the attribute information 500.

The storage unit 406 stores, for example, various types of information such as the attribute information 500, data, programs, and the like. The storage unit 406 may be a storage unit external to the server apparatus 10, such as a storage server or a cloud service, for example.

Functional Configuration of Image Forming Apparatus

In the image forming apparatus 20, for example, the CPU 301 executes a program stored in a storage medium to implement a reception unit 411, a generation unit 412, a transmission request unit 413, a facsimile transmission unit 414, a history management unit 415, and a storage unit 416. At least some of the functional components described above may be implemented by hardware.

The image forming apparatus 20 further includes the storage unit 416 that is implemented by the HD 308, the HDD controller 307, or the RAM 302b.

The reception unit 411 executes a reception process for receiving a transmission instruction indicating the first facsimile transmission or the second facsimile transmission from the transmission instruction unit 404 of the server apparatus 10.

The generation unit 412 executes a generation process for generating a facsimile transmission job in response to the transmission instruction received by the reception unit 411. In one example, the facsimile transmission system 1 can perform the first facsimile transmission and the second facsimile transmission by using various image processing operations executable by the image forming apparatus 20. Examples of the image processing operations include composition of a copy-forgery-inhibited pattern, addition of a time stamp, and addition of text. In this example, the generation unit 412 may execute various image processing operations on a document to generate a facsimile transmission job.

The transmission request unit 413 uses the facsimile transmission job generated by the generation unit 412 to execute a transmission request process for requesting the facsimile server 3 to perform the second facsimile transmission. For example, the transmission request unit 413 transmits the facsimile transmission job to the facsimile server 3 by transmitting an email to the facsimile server 3 or by using a web API provided by the facsimile server 3.

The facsimile transmission unit 414 executes, for example, a facsimile transmission process for transmitting the facsimile transmission job generated by the generation unit 412 to a destination fax 4 (first facsimile transmission) by using the FCU 360.

The history management unit 415 stores a transmission history of the first facsimile transmission and the second facsimile transmission in the storage unit 416 and manages the transmission history. In one example, the history management unit 415 may be included in the server apparatus 10. In this example, it is desirable for the image forming apparatus 20 to transmit the transmission history to the server apparatus 10 when the first facsimile transmission or the second facsimile transmission is performed without the intervention of the server apparatus 10.

The storage unit 416 stores, for example, various types of information such as the transmission history, data, programs, and the like. The storage unit 416 may be a storage unit external to the image forming apparatus 20, such as a storage server or a cloud service, for example.

Functional Configuration of Facsimile Server

In the facsimile server 3, for example, the CPU 201 executes a program stored in a storage medium such as the HD 204 or the ROM 202 to implement a data reception unit 421, a control unit 422, and a data transmission unit 423. At least some of the functional components described above may be implemented by hardware.

The facsimile server 3 further includes a storage unit 424, which is implemented by the HD 204, the HDD controller 205, or the RAM 203.

For example, the data reception unit 421 receives a facsimile transmission job transmitted from the image forming apparatus 20 to the facsimile server 3. The facsimile transmission job includes, for example, facsimile (fax) data, destination information, and user information.

The control unit 422 controls the second facsimile transmission for transmitting a fax to the destination fax 4 in accordance with the facsimile transmission job received by the data reception unit 421. For example, the control unit 422 stores the fax data, the destination information, and the user information, which are included in the facsimile transmission job received by the data reception unit 421, in the storage unit 424. Further, the control unit 422 converts the fax data into image data, as appropriate, and transmits the fax data (or image) to a destination designated in the destination information (e.g., the destination fax 4) by using the data transmission unit 423.

The data transmission unit 423 transmits the fax data (or image data) to the designated destination under the control of the control unit 422. In one example, the storage unit 424 stores the fax data, the destination information, and the user information, which are received by the data reception unit 421, and a program for implementing the functions of the facsimile server 3.

The functional configuration of the facsimile transmission system 1 illustrated in FIG. 4 is an example. In one example, as illustrated in FIG. 6, the functional components of the server apparatus 10 may be included in the image forming apparatus 20.

Figure 6:
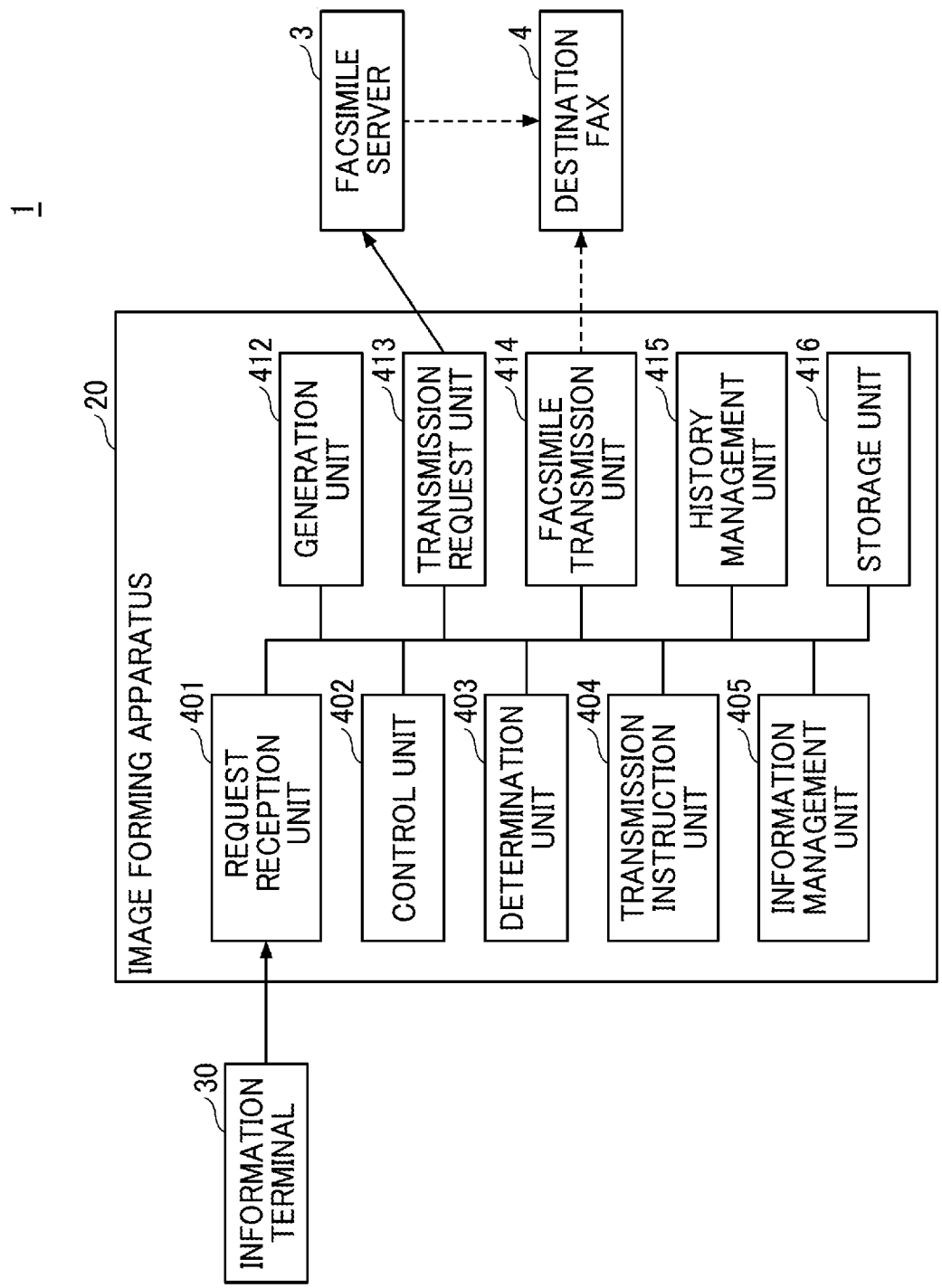
FIG. 6 is a block diagram illustrating another functional configuration of the facsimile transmission system of FIG. 1, according to an embodiment of the present disclosure.

FIG. 6 is a block diagram illustrating another example functional configuration of a facsimile transmission system according to the present embodiment. In the example illustrated in FIG. 6, the image forming apparatus 20 includes the components of the server apparatus 10 illustrated in FIG. 4, namely, the request reception unit 401, the control unit 402, the determination unit 403, the transmission instruction unit 404, and the information management unit 405. In this case, the request reception unit 401, the control unit 402, the determination unit 403, the transmission instruction unit 404, and the information management unit 405 are implemented by a program executed by the CPU 301 of the image forming apparatus 20.

The reception unit 411 included in the image forming apparatus 20 illustrated in FIG. 4 is omitted. In this case, the transmission instruction unit 404 instructs the generation unit 412 to perform the first facsimile transmission or the second facsimile transmission in accordance with the determination result obtained by the determination unit 403.

As described above, the image forming apparatus 20 may include at least some of the functional components of the server apparatus 10. In one example, the server apparatus 10 may include at least some of the functional components of the image forming apparatus 20. In another example, the functional components of the server apparatus 10 may be distributed to a plurality of servers In short, the functional components of the facsimile transmission system 1 are included in the facsimile transmission system 1.

Processes

Process Performed by Server Apparatus

Figure 7:
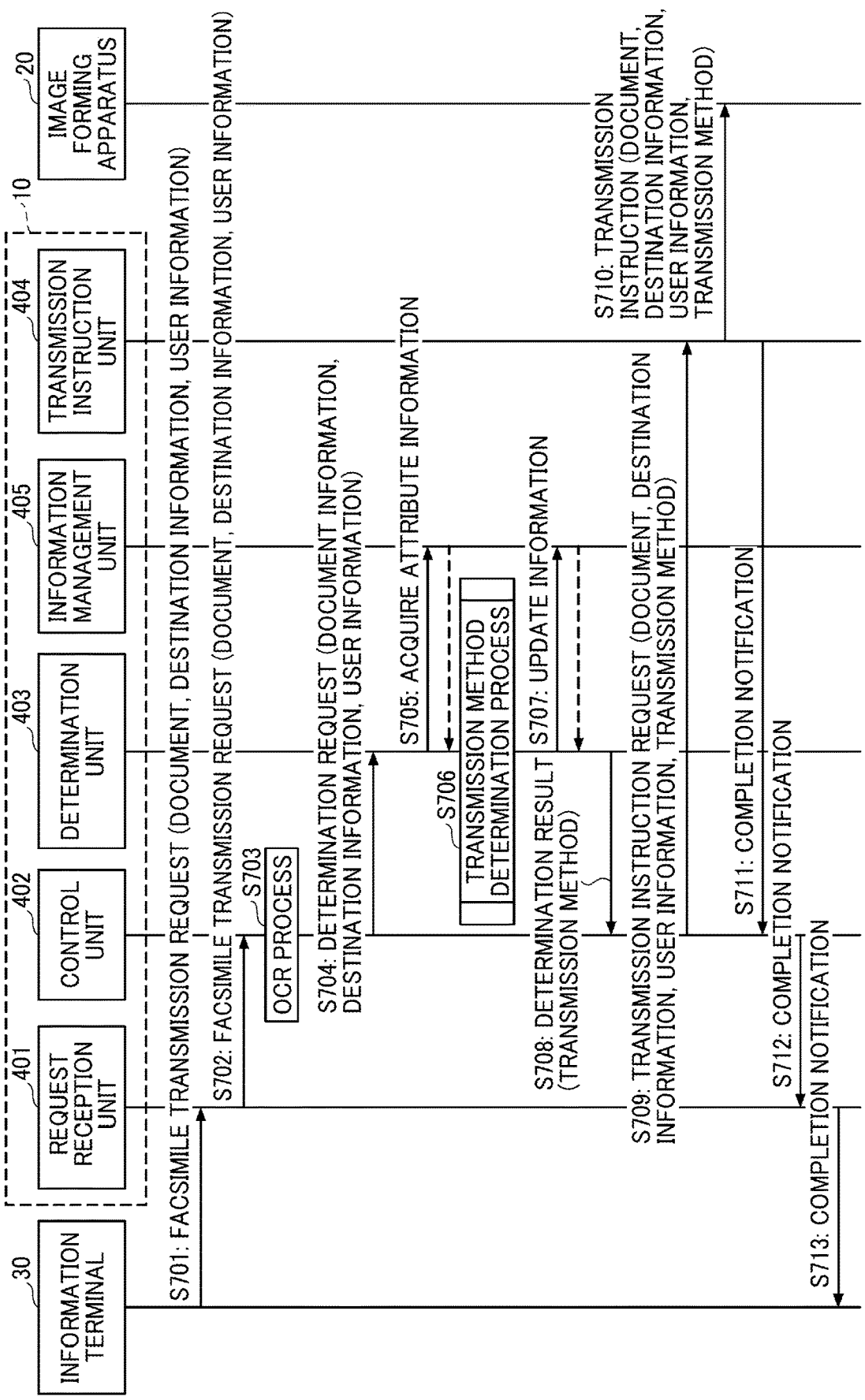
FIG. 7 is a sequence diagram illustrating a facsimile transmission process according to an embodiment of the present disclosure.

FIG. 7 is a sequence diagram illustrating a facsimile transmission process according to the present embodiment. The process illustrated in FIG. 7 is an example of a process executed by the server apparatus 10 having the functional configuration illustrated in FIG. 4.

In step S701, the information terminal 30 transmits a facsimile transmission request to the server apparatus 10. The facsimile transmission request includes, for example, a document (electronic data) for facsimile transmission, destination information indicating the destination of the facsimile transmission, and user information. The user information is information on the user of the device from which the facsimile transmission request is transmitted (facsimile transmission source).

In step S702, the request reception unit 401 of the server apparatus 10 notifies the control unit 402 of the facsimile transmission request received from the information terminal 30.

In step S703, the control unit 402 executes an OCR process on the document included in the facsimile transmission request.

In step S704, the control unit 402 transmits, to the determination unit 403, a determination request for requesting the determination unit 403 to determine whether to perform the first facsimile transmission or the second facsimile transmission. The determination request includes, for example, document information including a character string extracted in the OCR process, the destination information, the user information, and the like.

In step S705, the determination unit 403 acquires, for example, the attribute information 500 illustrated in FIG. 5 from the information management unit 405 or the storage unit 406. In step S706, the determination unit 403 executes a transmission method determination process for determining whether to perform the first facsimile transmission or the second facsimile transmission, by using the acquired attribute information 500. The transmission method determination process will be described below using a plurality of embodiments as examples.

In step S707, the determination unit 403 updates the attribute information 500 managed by the information management unit 405 or the transmission history as appropriate. In step S708, the determination unit 403 notifies the control unit 402 of a determination result including a transmission method indicating whether to perform the first facsimile transmission or the second facsimile transmission.

In step S709, the control unit 402 transmits, to the transmission instruction unit 404, a transmission instruction request for requesting the transmission instruction unit 404 to issue a transmission instruction for facsimile transmission. The transmission instruction request includes information such as the document, the destination information, the user information, and the transmission method indicating whether to perform the first facsimile transmission or the second facsimile transmission, for example.

In step S710, the transmission instruction unit 404 transmits the transmission instruction for facsimile transmission to the image forming apparatus 20. The transmission instruction includes information such as the document, the destination information, the user information, and the transmission method indicating whether to perform the first facsimile transmission or the second facsimile transmission, for example.

In step S711, the transmission instruction unit 404 notifies the control unit 402 of a completion notification. In steps S712 and S713, the control unit 402 transmits the completion notification to the information terminal 30 via the request reception unit 401. The processing of steps S711 to S713 may be executed after the completion notification is received from the image forming apparatus 20 in response to the transmission instruction transmitted to the image forming apparatus 20.

Process Performed by Image Forming Apparatus

Figure 8:
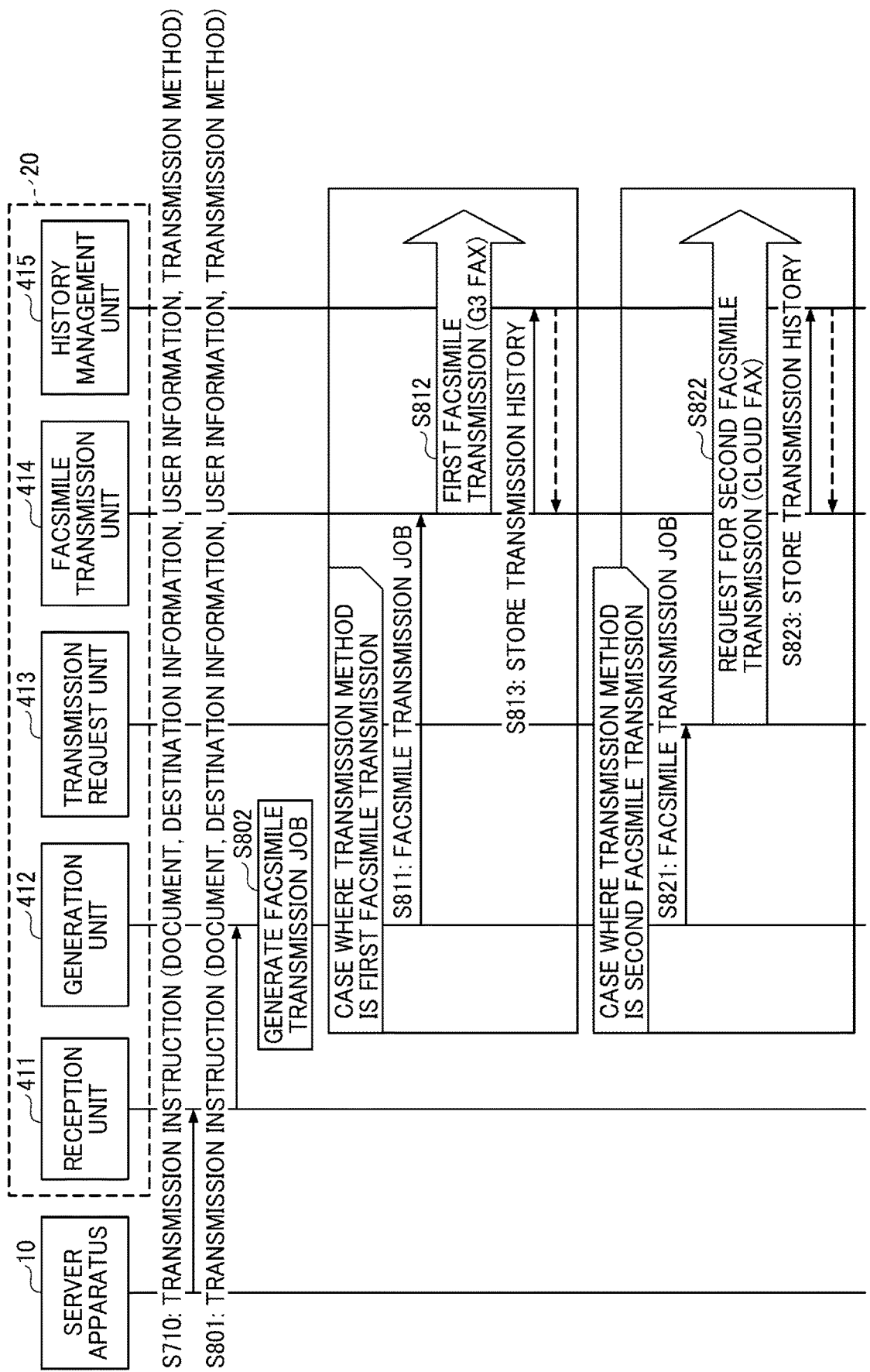
FIG. 8 is a sequence diagram illustrating a facsimile transmission process according to an embodiment of the present disclosure.

FIG. 8 is a sequence diagram illustrating a facsimile transmission process according to the present embodiment. The process illustrated in FIG. 8 is an example of a process executed by the image forming apparatus 20 having the functional configuration illustrated in FIG. 4.

In response to the transmission instruction transmitted from the transmission instruction unit 404 of the server apparatus 10 in step S710 in FIG. 7, the image forming apparatus 20 executes the processing of step S801 and the subsequent steps.

In step S801, the reception unit 411 of the image forming apparatus 20 notifies the generation unit 412 of the transmission instruction received from the server apparatus 10.

In step S802, the generation unit 412 executes a generation process for generating a facsimile transmission job, based on the content of the transmission instruction, namely, the document, the destination information, the user information, the transmission method, and the like. In one example, the generation unit 412 may convert the document into image data in a predetermined format, based on the transmission method indicating whether to perform the first facsimile transmission or the second facsimile transmission. In another example, the generation unit 412 may execute an image processing operation executable by the image forming apparatus 20, as appropriate.

When the transmission method is the first facsimile transmission, the image forming apparatus 20 executes the processing of steps S811 to S813. For example, in step S811, the generation unit 412 notifies the facsimile transmission unit 414 of the generated facsimile transmission job. In step S812, the facsimile transmission unit 414 performs the first facsimile transmission to the destination fax 4 by using the notified facsimile transmission job. In one example, the facsimile transmission unit 414 performs Group 3 (G3) facsimile transmission through the telephone line 5. In step S813, the facsimile transmission unit 414 stores the transmission history of the first facsimile transmission in the transmission history managed by the history management unit 415.

On the other hand, when the transmission method is the second facsimile transmission, the image forming apparatus 20 executes the processing of steps S821 to S823. For example, in step S821, the generation unit 412 notifies the transmission request unit 413 of the generated facsimile transmission job.

In step S822, the transmission request unit 413 uses the notified facsimile transmission job to request the facsimile server 3 to perform the second facsimile transmission. In response to the facsimile server 3 receiving a request for the second facsimile transmission, the control unit 422 of the facsimile server 3 performs the second facsimile transmission for transmitting the fax data (or image data) to the designated destination, based on the destination information included in the received request.

In step S823, the facsimile transmission unit 414 stores the transmission history of the second facsimile transmission in the transmission history managed by the history management unit 415.

After the completion of the process described above, the facsimile transmission unit 414 or the transmission request unit 413 may transmit a completion notification to the server apparatus 10 via the reception unit 411.

Transmission Method Determination Process

Next, an example of the transmission method determination process executed by the determination unit 403 will be described.

First Embodiment

Figure 9:
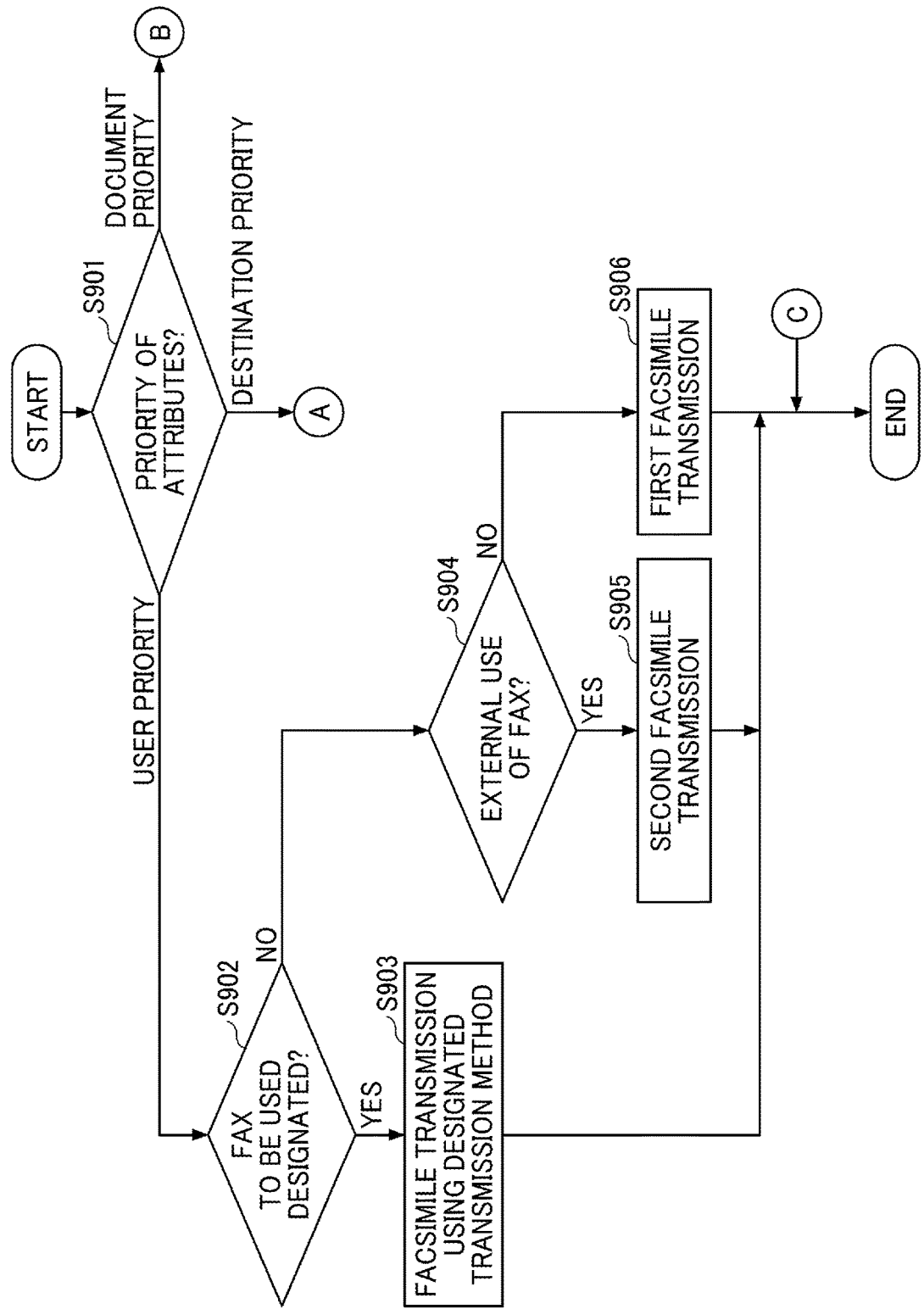
FIG. 9 is a flowchart of a determination process according to a first embodiment of the present disclosure.

FIGS. 9 to 11 are a flowchart illustrating of a transmission method determination process according to a first embodiment. This process is an example of the transmission method determination process executed by the determination unit 403 in step S706 illustrated in FIG. 7, for example.

In step S901, for example, the determination unit 403 refers to the item "priority of attributes" 511 included in the "user" attribute 501 in the attribute information 500 illustrated in FIG. 5 to determine the priority of the attributes. When the item "priority of attributes" 511 is set to "user priority," the determination unit 403 causes the process to proceed to step S902. When the item "priority of attributes" 511 is set to "destination priority," the determination unit 403 causes the process to proceed to step S1001 in FIG. 10. When the item "priority of attributes" 511 is set to "document priority," the determination unit 403 causes the process to proceed to step S1101 in FIG. 11.

In step S902, for example, the determination unit 403 refers to the item "fax to be used" included in the "user" attribute 501 in the attribute information 500 illustrated in FIG. 5 to determine whether the fax to be used is designated. For example, when the item "fax to be used" is set to "normal fax" or "cloud fax," the determination unit 403 determines that the fax to be used is designated, and then causes the process to proceed to step S903. On the other hand, when the item "fax to be used" is set to "automatic determination," the determination unit 403 determines that the fax to be used is not designated, and then causes the process to proceed to step S904.

In step S903, the determination unit 403 determines to perform facsimile transmission by using the designated transmission method. For example, when the item "fax to be used" is set to "normal fax," the determination unit 403 determines to perform the first facsimile transmission. On the other hand, when the item "fax to be used" is set to "cloud fax," the determination unit 403 determines to perform the second facsimile transmission.

In step S904, the determination unit 403 refers to the item "external use of fax" included in the "user" attribute 501 in the attribute information 500 illustrated in FIG. 5 to determine whether there is external use of fax. For example, when there is external use of fax, the determination unit 403 causes the process to proceed to step S905, and determines to perform the second facsimile transmission. On the other hand, when there is no external use of fax, the determination unit 403 causes the process to proceed to step S906, and determines to perform the first facsimile transmission.

When the process proceeds from step S901 in FIG. 9 to step S1001 in FIG. 10, for example, the determination unit 403 refers to the item "fax to be used" included in the "destination" attribute 502 in the attribute information 500 illustrated in FIG. 5 to determine whether the fax to be used is designated. For example, when the item "fax to be used" is set to "normal fax" or "cloud fax," the determination unit 403 determines that the fax to be used is designated, and then causes the process to proceed to step S1002. On the other hand, when the item "fax to be used" is set to "automatic determination," the determination unit 403 determines that the fax to be used is not designated, and then causes the process to proceed to step S1003.

In step S1002, the determination unit 403 determines to perform facsimile transmission by using the designated transmission method. For example, when the item "fax to be used" is set to "normal fax," the determination unit 403 determines to perform the first facsimile transmission. On the other hand, when the item "fax to be used" is set to "cloud fax," the determination unit 403 determines to perform the second facsimile transmission.

In step S1003, the determination unit 403 determines the type of the destination. For example, the determination unit 403 uses an address book to determine whether the destination of the facsimile transmission is "customer," "vendor," or "other." When the type of the destination is "customer," the determination unit 403 causes the process to proceed to step S1004. When the type of the destination is "vendor," the determination unit 403 causes the process to proceed to step S1005. When the type of the destination is "other," the determination unit 403 causes the process to proceed to step S1006.

In step S1004, the determination unit 403 determines to perform the first facsimile transmission. In step S1005, the determination unit 403 determines to perform the second facsimile transmission.

In step S1006, the determination unit 403 determines whether the number of destinations, which is the number of destinations of the facsimile transmission, is greater than or equal to 10. When the number of destinations is greater than or equal to 10, the determination unit 403 causes the process to proceed to step S1005, and determines to perform the second facsimile transmission. On the other hand, when the number of destinations is less than 10, the determination unit 403 causes the process to proceed to step S1004, and determines to perform the first facsimile transmission.

When the process proceeds from step S901 in FIG. 9 to step S1101 in FIG. 11, the determination unit 403 determines the confidentiality level of the document. For example, the determination unit 403 determines whether the confidentiality level of the document is "internal use only," "personal information included," or "other," based on a keyword extracted from text data obtained by the control unit 402 subjecting the document to the OCR process. When the confidentiality level of the document is "internal use only" and when the confidentiality level of the document is "personal information included," the determination unit 403 causes the process to proceed to step S1102. On the other hand, when the confidentiality level of the document is "other," the determination unit 403 causes the process to proceed to step S1103.

In step S1102, the determination unit 403 determines to perform the first facsimile transmission.

In step S1103, the determination unit 403 determines whether the paper size of the document is less than or equal to A4. When the paper size is less than or equal to A4, the determination unit 403 causes the process to proceed to step S1104. On the other hand, when the paper size is not less than or equal to A4, the determination unit 403 causes the process to proceed to step S1102, and determines to perform the first facsimile transmission. In step S1104, the determination unit 403 determines to perform the second facsimile transmission.

Through the process illustrated in FIGS. 9 to 11, the determination unit 403 can determine whether to perform the first facsimile transmission or the second facsimile transmission, namely which one of the first facsimile transmission and the second facsimile transmission is to be performed, based on the "user" attribute 501, the "destination" attribute 502, or the "document" attribute 503. The transmission method determination process illustrated in FIGS. 9 to 11 is an example. For example, the transmission method determination process changes if the attribute information 500 illustrated in FIG. 5 changes.

Second Embodiment

FIG. 12 is a table illustrating attribute information according to a second embodiment. Attribute information 1200 according to the second embodiment includes additional items, compared to the attribute information 500 described with reference to FIG. 5. For example, the "user" attribute 501 further includes items "priority of items" 1201 and "transmission history of user" 1202. The item "priority of items" 1201 indicates the priority of items below the item "priority of items" 1201 (e.g., the items "external use of fax" and "transmission history of user").

The item "transmission history of user" 1202 indicates whether one or more facsimile transmissions previously performed by the user are "first facsimile transmission," "second facsimile transmission," or "other" (both or none).

For example, when the item "priority of items" 1201 is set to "transmission history of user>external use of fax" and the one or more facsimile transmissions previously performed by the user are "first facsimile transmission" and do not include "second facsimile transmission," the determination unit 403 determines to perform the first facsimile transmission. When the item "priority of items" 1201 is set to "transmission history of user>external use of fax" and the one or more facsimile transmissions previously performed by the user are "second facsimile transmission" and do not include "first facsimile transmission," the determination unit 403 determines to perform the second facsimile transmission. When the item "priority of items" 1201 is set to "transmission history of user>external use of fax" and the one or more facsimile transmissions previously performed by the user are "other," the determination unit 403 determines the transmission method for the facsimile transmission in accordance with the item "external use of fax" with the next priority.

The "destination" attribute 502 further includes items "priority of items" 1203 and "transmission history of destination" 1204. The item "priority of items" 1203 indicates the priority of items below the item "priority of items" 1203 (e.g., the items "type," "number of destinations," and "transmission history of destination").

The item "transmission history of destination" 1204 indicates whether one or more previous facsimile transmissions to the destination of the facsimile transmission are "first facsimile transmission," "second facsimile transmission," or "other" (both or none).

For example, when the item "priority of items" 1203 is set to "transmission history of destination>type>number of destinations" and the one or more previous facsimile transmissions to the destination are "first facsimile transmission" and do not include "second facsimile transmission," the determination unit 403 determines to perform the first facsimile transmission. When the item "priority of items" 1203 is set to "transmission history of destination>type>number of destinations" and the one or more previous facsimile transmissions to the destination are "second facsimile transmission" and do not include "first facsimile transmission," the determination unit 403 determines to perform the second facsimile transmission. When the item "priority of items" 1203 is set to "transmission history of destination>type>number of destinations" and the one or more previous facsimile transmissions to the destination are "other," the determination unit 403 determines the transmission method for the facsimile transmission in accordance with the item "type" with the next priority. Likewise, when the item "type" is set to "other," the determination unit 403 determines the transmission method for the facsimile transmission in accordance with the item "number of destinations" with the next priority.

Figure 13:
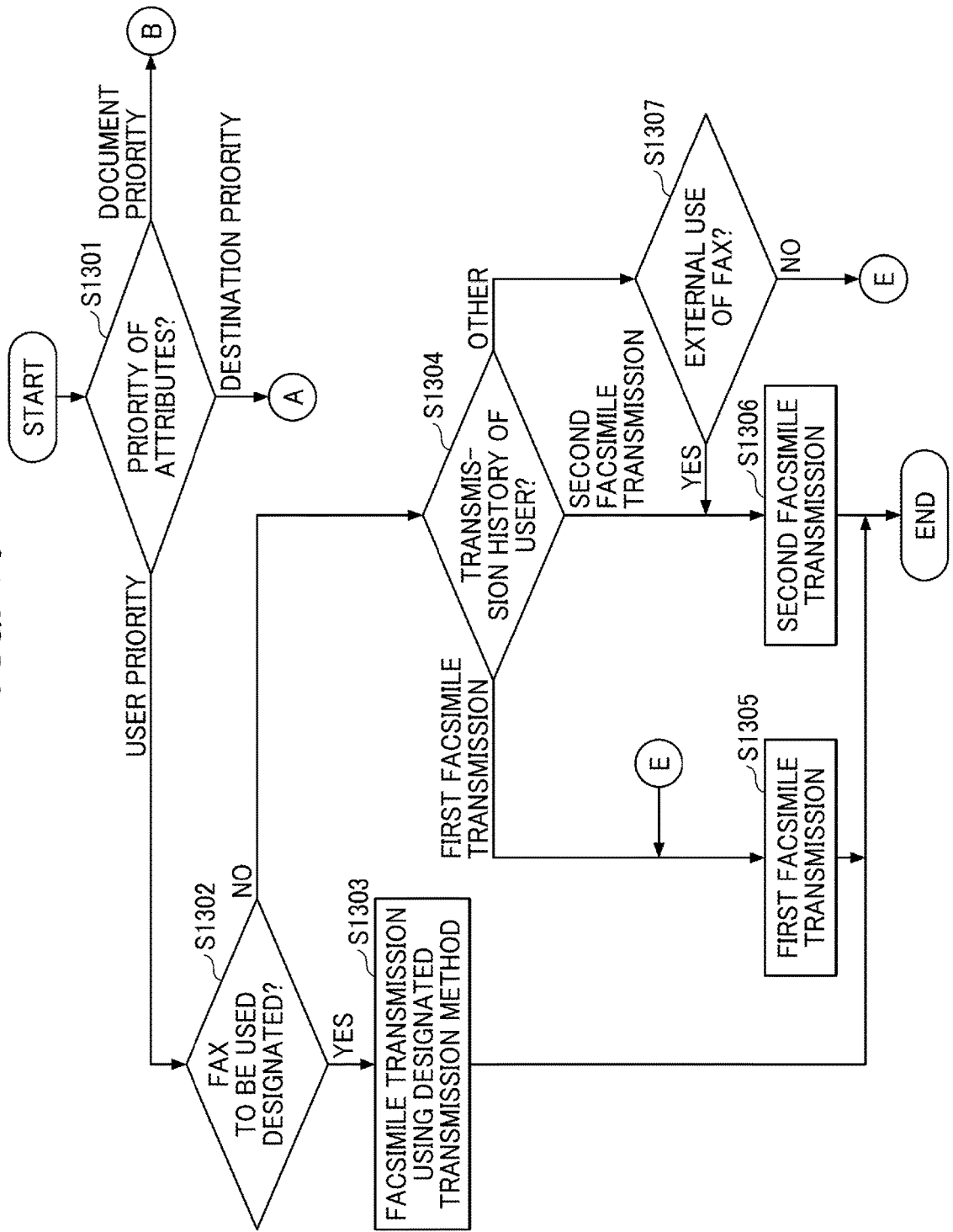
FIG. 13 is a flowchart of a determination process according to the second embodiment of the present disclosure.

FIGS. 13 and 14 are a flowchart of a transmission method determination process according to the second embodiment.

This process is another example of the transmission method determination process executed by the determination unit 403 in step S706 illustrated in FIG. 7, for example. The detailed description of processing similar to that in the first embodiment will be omitted.

In step S1301, for example, the determination unit 403 refers to the item "priority of attributes" included in the "user" attribute 501 in the attribute information 1200 illustrated in FIG. 12 to determine the priority of the attributes. When the item "priority of attributes" is set to "user priority," the determination unit 403 causes the process to proceed to step S1302. When the item "priority of attributes" is set to "destination priority," the determination unit 403 causes the process to proceed to step S1401 in FIG. 14.

The processing performed when the item "priority of attributes" is set to "document priority" is similar to that of the process according to the first embodiment described with reference to FIG. 11, and the description thereof will thus be omitted.

In step S1302, for example, the determination unit 403 refers to the item "fax to be used" included in the "user" attribute 501 in the attribute information 1200 illustrated in FIG. 12 to determine whether the fax to be used is designated. For example, when the item "fax to be used" is set to "normal fax" or "cloud fax," the determination unit 403 determines that the fax to be used is designated, and then causes the process to proceed to step S1303. On the other hand, when the item "fax to be used" is set to "automatic determination," the determination unit 403 determines that the fax to be used is not designated, and then causes the process to proceed to step S1304.

In step S1303, the determination unit 403 determines to perform facsimile transmission by using the designated transmission method.

In step S1304, the determination unit 403 checks the transmission history of the user. In one example, in step S707 illustrated in FIG. 7, the server apparatus 10 updates the information on the transmission history of the user indicated by the item "transmission history of user" 1202 included in the "user" attribute 501 in the attribute information 1200 illustrated in FIG. 12. As a result, the determination unit 403 can refer to the information on the item "transmission history of user" 1202 to determine whether the transmission history of the user indicates "first facsimile transmission," "second facsimile transmission," or "other." In another example, the determination unit 403 may refer to the transmission history managed by the history management unit 415 to determine whether the transmission history of the user indicates "first facsimile transmission," "second facsimile transmission," or "other."

When the transmission history of the user indicates "first facsimile transmission," the determination unit 403 causes the process to proceed to step S1305. When the transmission history of the user indicates "second facsimile transmission," the determination unit 403 causes the process to proceed to step S1306. When the transmission history of the user indicates "other," the determination unit 403 causes the process to proceed to step S1307.

In step S1305, the determination unit 403 determines to perform the first facsimile transmission. In step S1306, the determination unit 403 determines to perform the second facsimile transmission.

In step S1307, for example, the determination unit 403 refers to the item "external use of fax" included in the "user" attribute 501 in the attribute information 1200 illustrated in FIG. 12 to determine whether there is external use of fax. When there is external use of fax, the determination unit 403 causes the process to proceed to step S1306, and determines to perform the second facsimile transmission. On the other hand, when there is no external use of fax, the determination unit 403 causes the process to proceed to step S1305, and determines to perform the first facsimile transmission.

When the process proceeds from step S1301 in FIG. 13 to step S1401 in FIG. 14, for example, the determination unit 403 refers to the item "fax to be used" included in the "destination" attribute 502 in the attribute information 1200 illustrated in FIG. 12 to determine whether the fax to be used is designated. For example, when the item "fax to be used" is set to "normal fax" or "cloud fax," the determination unit 403 determines that the fax to be used is designated, and then causes the process to proceed to step S1402. On the other hand, when the item "fax to be used" is set to "automatic determination," the determination unit 403 determines that the fax to be used is not designated, and then causes the process to proceed to step S1403.

In step S1402, the determination unit 403 determines to perform facsimile transmission by using the designated transmission method.

In step S1403, the determination unit 403 checks the transmission history of the destination of the facsimile transmission. In one example, in step S707 illustrated in FIG. 7, the server apparatus 10 updates the information on the transmission history of the destination indicated by the item "transmission history of destination" 1204 included in the "destination" attribute 502 in the attribute information 1200 illustrated in FIG. 12. As a result, the determination unit 403 can refer to the information on the item "transmission history of destination" 1204 to determine whether the transmission history of the destination indicates "first facsimile transmission," "second facsimile transmission," or "other." In another example, the determination unit 403 may refer to the transmission history managed by the history management unit 415 to determine whether the transmission history of the destination indicates "first facsimile transmission," "second facsimile transmission," or "other."

When the transmission history of the destination indicates "first facsimile transmission," the determination unit 403 causes the process to proceed to step S1404. When the transmission history of the destination indicates "second facsimile transmission," the determination unit 403 causes the process to proceed to step S1405. When the transmission history of the destination indicates "other," the determination unit 403 causes the process to proceed to step S1406.

In step S1404, the determination unit 403 determines to perform the first facsimile transmission. In step S1405, the determination unit 403 determines to perform the second facsimile transmission.

In step S1406, the determination unit 403 determines the type of the destination. For example, the determination unit 403 uses an address book to determine whether the destination of the facsimile transmission is "customer," "vendor," or "other." When the type of the destination is "customer," the determination unit 403 causes the process to proceed to step S1404, and determines to perform the first facsimile transmission. When the type of the destination is "vendor," the determination unit 403 causes the process to proceed to step S1405, and determines to perform the second facsimile transmission. When the type of the destination is "other," the determination unit 403 causes the process to proceed to step S1407.

In step S1407, the determination unit 403 determines whether the number of destinations, which is the number of destinations of the facsimile transmission, is greater than or equal to 10. When the number of destinations is greater than or equal to 10, the determination unit 403 causes the process to proceed to step S1405, and determines to perform the second facsimile transmission. On the other hand, when the number of destinations is less than 10, the determination unit 403 causes the process to proceed to step S1404, and determines to perform the first facsimile transmission.

As described above, in the facsimile transmission system 1 with which the first facsimile transmission using the image forming apparatus 20 and the second facsimile transmission using the facsimile server 3 are available, it is desirable to perform facsimile transmission by using a more suitable transmission method in accordance with, for example, the purpose or application of the facsimile transmission.

According to the embodiment described above, facsimile transmission can be performed by using a more suitable transmission method in accordance with the purpose, application, or the like of the facsimile transmission, for example.

The attribute information 1200 illustrated in FIG. 12 and the transmission method determination process illustrated in FIGS. 13 and 14 are an example, and various modifications or applications are possible.

According to the above-described embodiment of the present disclosure, in the facsimile transmission system 1 with which the first facsimile transmission using the image forming apparatus 20 and the second facsimile transmission using the facsimile server 3 are available, facsimile transmission can be performed by using a more suitable transmission method.

Each of the functions in the embodiments described above may be implemented by one or more processing circuits or circuitry. As used herein, the term "processing circuit or circuitry" includes processors programmed to implement each function by software, such as a processor implemented by an electronic circuit, and devices designed to implement the functions described above, such as an ASIC, a digital signal processor (DSP), a field programmable gate array (FPGA), and existing circuit modules.

The group of apparatuses described in the examples is merely representative of one of multiple computing environments for implementing the embodiments disclosed herein. In some embodiments, the server apparatus 10 includes multiple computing devices such as server clusters. The multiple computing devices are configured to communicate with one another through any type of communication link, including a network, a shared memory, etc., and perform the processes disclosed herein.

The functional components of the server apparatus 10 may be integrated into one server apparatus or divided into a plurality of apparatuses. At least some of the functional components of the server apparatus 10 may be included in the image forming apparatus 20. At least some of the functional components of the image forming apparatus 20 may be included in the server apparatus 10.

In a facsimile transmission system with which first facsimile transmission using an image forming apparatus and second facsimile transmission using a facsimile server are available, it is desirable to perform facsimile transmission of a document by using a transmission method more suitable than the other depending on, for example, the purpose or application of the facsimile transmission.

In the related art, it has been difficult to perform facsimile transmission by using the most suitable transmission method according to, for example, the purpose or application of the facsimile transmission.

According to one or more embodiments of the present disclosure, in a facsimile transmission system with which first facsimile transmission using an image forming apparatus and second facsimile transmission using a facsimile server are available, facsimile transmission can be performed by using a more suitable transmission method in accordance with, for example, the purpose or application of the facsimile transmission.

A facsimile transmission system, a facsimile transmission method, and a program (storage medium) according to the following aspects are disclosed herein.

First Aspect

In a first aspect, a facsimile transmission system, first facsimile transmission for transmitting a document by using an image forming apparatus and second facsimile transmission for transmitting a document by using a facsimile server are available. The facsimile transmission system includes a request reception unit, a determination unit, and a transmission instruction unit. The request reception unit receives, from a user, a facsimile transmission request for requesting facsimile transmission of a document. The determination unit determines whether to perform the first facsimile transmission or the second facsimile transmission, namely which one of the first facsimile transmission and the second facsimile transmission is to be performed, based on an attribute of the user, an attribute of a destination of the facsimile transmission, or an attribute of the document. The transmission instruction unit instructs to perform the first facsimile transmission or the second facsimile transmission according to a result of determination performed by the determination unit.

Second Aspect

According to a second aspect, in the facsimile transmission system according to the first aspect, the attribute of the user includes setting information indicating an attribute to be prioritized among the attribute of the user, the attribute of the destination, and the attribute of the document, and the determination unit determines whether to perform the first facsimile transmission or the second facsimile transmission in accordance with the attribute to be prioritized.

Third Aspect

According to a third aspect, in the facsimile transmission system according to the first aspect or the second aspect, in a case where the attribute of the user is prioritized, the determination unit determines whether to perform the first facsimile transmission or the second facsimile transmission in accordance with a transmission history including one or more facsimile transmissions previously performed by the user.

Fourth Aspect

According to a fourth aspect, in the facsimile transmission system according to any one of the first aspect to the third aspect, in a case where the attribute of the destination is prioritized, the determination unit determines whether to perform the first facsimile transmission or the second facsimile transmission in accordance with a transmission history including one or more previous facsimile transmissions to the destination.

Fifth Aspect

According to a fifth aspect, in the facsimile transmission system according to any one of the first aspect to the fourth aspect, in a case where the attribute of the document is prioritized, the determination unit determines whether to perform the first facsimile transmission or the second facsimile transmission, namely which one of the first facsimile transmission and the second facsimile transmission is to be performed, based on a confidentiality level of the document or a paper size of the document.

Sixth Aspect

According to a sixth aspect, in the facsimile transmission system according to any one of the first aspect to the fifth aspect, in a case where the attribute of the destination is prioritized, the determination unit determines whether to perform the first facsimile transmission or the second facsimile transmission, namely which one of the first facsimile transmission and the second facsimile transmission is to be performed, based on a type of the destination or the number of destinations of the facsimile transmission.

Seventh Aspect

According to a seventh aspect, the facsimile transmission system according to any one of the first aspect to the sixth aspect further includes a history management unit. The history management unit manages a transmission history of the first facsimile transmission and the second facsimile transmission.

Eighth Aspect

According to an eighth aspect, the facsimile transmission system according to any one of the first aspect to the seventh aspect further includes an information processing apparatus and the image forming apparatus. The information processing apparatus includes the request reception unit, the determination unit, and the transmission instruction unit. The transmission instruction unit instructs to the image forming apparatus to perform the first facsimile transmission and the second facsimile transmission. The image forming apparatus includes a reception unit, a generation unit, a facsimile transmission unit, and a transmission request unit. The reception unit receives the instruction from the transmission instruction unit. The generation unit generates a facsimile transmission job in response to the instruction. The facsimile transmission unit performs the first facsimile transmission according to the facsimile transmission job. The transmission request unit requests the facsimile server to perform the second facsimile transmission according to the facsimile transmission job.

Ninth Aspect

In a ninth aspect, a facsimile transmission method is executed by a computer in a facsimile transmission system in which first facsimile transmission for transmitting a document by using an image forming apparatus and second facsimile transmission for transmitting a document by using a facsimile server are available. The facsimile transmission method includes a request receiving process, a determination process, and a transmission instruction process. The request receiving process receives, from a user, a facsimile transmission request for requesting facsimile transmission of a document. The determination process determines whether to perform the first facsimile transmission or the second facsimile transmission, namely which one of the first facsimile transmission and the second facsimile transmission is to be performed, based on an attribute of the user, an attribute of a destination of the facsimile transmission, or an attribute of the document. The transmission instruction process instructs to perform the first facsimile transmission or the second facsimile transmission according to a result of the determination in the determination process.

Tenth Aspect

In a tenth aspect, a storage medium stores a program. The program is executed by a computer in a facsimile transmission system with which first facsimile transmission for transmitting a document by using an image forming apparatus and second facsimile transmission for transmitting a document by using a facsimile server are available. The program includes a request receiving process, a determination process, and a transmission instruction process. The request receiving process receives, from a user, a facsimile transmission request for requesting facsimile transmission of a document. The determination process determines whether to perform the first facsimile transmission or the second facsimile transmission, namely which one of the first facsimile transmission and the second facsimile transmission is to be performed, based on an attribute of the user, an attribute of a destination of the facsimile transmission, or an attribute of the document. The transmission instruction process instructs to perform the first facsimile transmission or the second facsimile transmission according to a result of the determination made in the determination process.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A facsimile transmission system comprising circuitry configured to:
    receive, from a user, a request for facsimile transmission of a document;
    determine which one of first facsimile transmission and second facsimile transmission is to be performed, based on one of an attribute of the user, an attribute of a destination of the facsimile transmission, and an attribute of the document,
        the first facsimile transmission being transmitting the document by an image forming apparatus,
        the second facsimile transmission being transmitting the document by a facsimile server; and
    instruct to perform the one of the first facsimile transmission and the second facsimile transmission, wherein
    the attribute of the user includes setting information indicating an attribute to be prioritized among the attribute of the user, the attribute of the destination, and the attribute of the document, and
    the circuitry is further configured to determine which one of the first facsimile transmission and the second facsimile transmission is to be performed based on the attribute to be prioritized.

2. The facsimile transmission system according to claim 1, wherein
    in a case where the attribute of the user is prioritized, the circuitry is configured to determine which one of the first facsimile transmission and the second facsimile transmission is to be performed, based on a transmission history including one or more facsimile transmissions previously performed by the user.

3. The facsimile transmission system according to claim 1, wherein
in a case where the attribute of the destination is prioritized, the circuitry is configured to determine which one of the first facsimile transmission and the second facsimile transmission is to be performed, based on a transmission history including one or more previous facsimile transmissions to the destination.

4. The facsimile transmission system according to claim 1, wherein
in a case where the attribute of the document is prioritized, the circuitry is configured to determine which one of the first facsimile transmission and the second facsimile transmission is to be performed, based on one of a confidentiality level of the document and a paper size of the document.

5. The facsimile transmission system according to claim 1, wherein
in a case where the attribute of the destination is prioritized, the circuitry is configured to determine which one of the first facsimile transmission and the second facsimile transmission is to be performed, based on one of a type of the destination and the number of destinations of the facsimile transmission.

6. The facsimile transmission system according to claim 1, wherein
the circuitry is configured to manage a transmission history of the first facsimile transmission and the second facsimile transmission.

7. The facsimile transmission system according to claim 1, further comprising:
an information processing apparatus including the circuitry; and
the image forming apparatus, wherein
the circuitry is configured to transmit, to the image forming apparatus, an instruction to perform the first facsimile transmission and the second facsimile transmission, and
the image forming apparatus includes additional circuitry configured to:
receive the instruction from the information processing apparatus;
generate a facsimile transmission job based on the instruction;
perform the first facsimile transmission according to the facsimile transmission job; and
request the facsimile server to perform the second facsimile transmission according to the facsimile transmission job.

8. A facsimile transmission method comprising:
receiving, from a user, a request for facsimile transmission of a document;
determining which one of first facsimile transmission and second facsimile transmission is to be performed, based on one of an attribute of the user, an attribute of a destination of the facsimile transmission, and an attribute of the document,
the first facsimile transmission being transmitting the document by an image forming apparatus,
the second facsimile transmission being transmitting the document by a facsimile server; and
instructing to perform the one of the first facsimile transmission and the second facsimile transmission, wherein
the attribute of the user includes setting information indicating an attribute to be prioritized among the attribute of the user, the attribute of the destination, and the attribute of the document, and
in the determining, which one of the first facsimile transmission and the second facsimile transmission is to be performed is determined based on the attribute to be prioritized.

9. A non-transitory recording medium storing a plurality of instructions which, when executed by one or more processors, causes the plurality of processors to perform a facsimile transmission method comprising:
receiving, from a user, a request for facsimile transmission of a document;
determining which one of first facsimile transmission and second facsimile transmission is to be performed, based on one of an attribute of the user, an attribute of a destination of the facsimile transmission, and an attribute of the document,
the first facsimile transmission being transmitting the document by an image forming apparatus,
the second facsimile transmission being transmitting the document by a facsimile server; and
instructing to perform the one of the first facsimile transmission and the second facsimile transmission, wherein
the attribute of the user includes setting information indicating an attribute to be prioritized among the attribute of the user, the attribute of the destination, and the attribute of the document, and
in the determining, which one of the first facsimile transmission and the second facsimile transmission is to be performed is determined based on the attribute to be prioritized.

* * * * *